US008282728B2

(12) United States Patent
Subramanian et al.

(10) Patent No.: US 8,282,728 B2
(45) Date of Patent: Oct. 9, 2012

(54) MATERIALS WITH TRIGONAL BIPYRAMIDAL COORDINATION AND METHODS OF MAKING THE SAME

(75) Inventors: Munirpallam A. Subramanian, Philomath, OR (US); Arthur W. Sleight, Philomath, OR (US); Andrew E. Smith, Rice Lake, WI (US)

(73) Assignee: State of Oregon Acting by and through the State Board of Higher Education on behalf of Oregon State University, Corvallis, OR (US)

( * ) Notice: Subject to any disclaimer, the term of this patent is extended or adjusted under 35 U.S.C. 154(b) by 197 days.

(21) Appl. No.: 12/802,700

(22) Filed: Jun. 10, 2010

(65) Prior Publication Data

US 2010/0317503 A1    Dec. 16, 2010

Related U.S. Application Data

(60) Provisional application No. 61/268,479, filed on Jun. 11, 2009.

(51) Int. Cl.
*C04B 14/00*    (2006.01)

(52) U.S. Cl. ......... 106/401; 106/31.13; 501/41; 501/42; 501/50; 501/53; 501/152

(58) Field of Classification Search ............... 106/31.13, 106/401; 501/41, 42, 50, 53, 152
See application file for complete search history.

(56) References Cited

U.S. PATENT DOCUMENTS

| 6,416,868 | B1 | 7/2002 | Sullivan et al. | |
| 6,485,557 | B1 * | 11/2002 | Swiler | 106/479 |
| 6,541,112 | B1 | 4/2003 | Swiler et al. | |
| 6,541,645 | B1 * | 4/2003 | Canary et al. | 549/5 |
| 6,582,814 | B2 | 6/2003 | Swiler et al. | |
| 7,024,068 | B2 * | 4/2006 | Canary et al. | 385/15 |
| 2003/0229131 | A1 * | 12/2003 | Sessler et al. | 514/410 |

OTHER PUBLICATIONS

Smith, Andrew E. et al., "Mn3+ in Trigonal Bipyramidal Coordination: A New Blue Chromophore" J. Am. Chem. Soc. vol. 131, No. 47 (available online on Nov. 9, 2009) pp. 17084-17086.*
Subramanian, Munirpallam A. et al., "Noval tunable ferroelectric compositions: Ba1–xLnxTi1–xMxO3 (Ln=La, Sm, Gd, Dy; M=Al, Fe, Cr)" Solid State Sciences 2 (2000) pp. 507-512.*

(Continued)

*Primary Examiner* — Jessica L Ward
*Assistant Examiner* — Ross J Christie
(74) *Attorney, Agent, or Firm* — Klarquist Sparkman, LLP

(57) ABSTRACT

Embodiments of compositions comprising materials satisfying the general formula $AM_{1-x}M'_xM''_yO_{3+y}$ are disclosed, along with methods of making the materials and compositions. In some embodiments, M and M' are +3 cations, at least a portion of the M cations and the M' cations are bound to oxygen in trigonal bipyramidal coordination, and the material is chromophoric. In some embodiments, the material forms a crystal structure having a hexagonal unit cell wherein edge a has a length of 3.50-3.70 Å and edge c has a length of 10-13 Å. In other embodiments, edge a has a length of 5.5-7.0 Å. In particular embodiments, M' is Mn, and Mn is bonded to oxygen with an apical Mn—O bond length of 1.80 Å to 1.95 Å. In some embodiments, the material is $YIn_{1-x}Mn_xO_3$, x is greater than 0.0 and less than 0.75, and the material exhibits a surprisingly intense blue color.

33 Claims, 8 Drawing Sheets
(7 of 8 Drawing Sheet(s) Filed in Color)

0.00  0.02   0.05    0.1    0.25   0.3    0.4    0.5   0.75  0.9    1.0

YIn$_{0.9}$Mn$_{0.1}$O$_3$    LuGa$_{0.95}$Mn$_{0.05}$MgO$_4$

OTHER PUBLICATIONS

Color Pigments Manufacturers Association, Inc., Classification and Chemical Descriptions of the Complex Inorganic Color Pigments, 4$^{th}$ ed. (2010).*

Fennie et al., "Ferroelectric transition in YMnO$_3$ from first principles," *Phys. Rev. B.*, vol. 72, 100103(R), 4 pp. (2005).

Kresse et al., "Efficient iterative schemes for ab initio total-energy calculations using a plane-wave basis set," *Phys. Rev. B.*, vol. 54, No. 16, pp. 11169-11186 (1996).

Kresse et al., "From ultrasoft pseudopotentials to the projector augmented-wave method," *Phys. Rev. B.*, vol. 59, No. 3, pp. 1758-1775 (1999).

Liechtenstein et al., "Density-functional theory and strong interactions: Orbital ordering in Mott-Hubbard insulators," *Phys. Rev. B.* vol. 52, No. 8, 5 pp. (1995).

Hadermann, "Synthesis and crystal structure of the Sr$_2$Al$_{1.07}$Mn$_{0.93}$O$_5$ brownmillerite," *Journal of Materials Chemistry*, pp. 692-698, 2007.

"Manganese Blue Hue" *Golden Artist Colors*, downloaded from http://www.goldenpaints.com/products/color/heavybody/colors/1457infopg.php, 2 pp., May 25, 2010.

Shirin et al., "Synthesis and structure of a MnIII(OH) complex generated from dioxygen," *Chem. Commun.*, pp. 1967-1968, 1997.

Van Aken et al, "Hexagonal YMnO$_3$," *Acta Crystallographica Section C Crystal Structure Communications*, pp. 230-232, 2001.

Van Aken et al. "Hexagonal YbMnO$_3$ revisited," *Acta Crystallographica Section E Structure Reports Online*, pp. i87-i89, Sep. 29, 2001.

Van Aken et al., "Hexagonal ErMnO$_3$," *Acta Crystallographica Section E Structure Reports Online*, pp. i38-i40, 2001.

Van Aken et al., "Hexagonal LuMnO$_3$ revisited," *Acta Crystallographica Section E Structure Reports Online* pp. i101-i103, Oct. 27, 2001.

Van Aken et al., "Hexagonal ErMnO$_3$," *Acta Crystallographica Section E—Electronic Paper*, pp. 7, 2001.

Van Aken et al., "Hexagonal YbMnO$_3$ revisited," *Acta Crystallographica Section E—Electronic paper*, 7 pp., 2001.

Van Aken et al., "Hexagonal YMnO$_3$," *Acta Crystallographica Section C*, 14 pp., 2001.

* cited by examiner

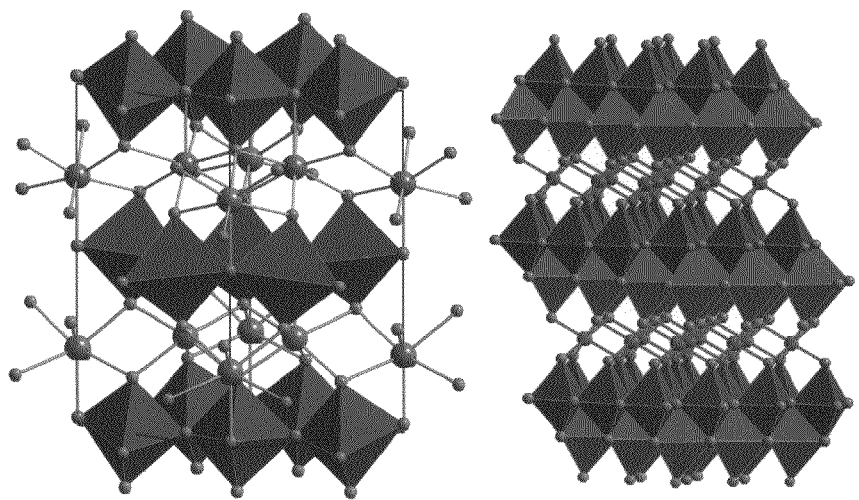
FIG. 1A                FIG. 1B
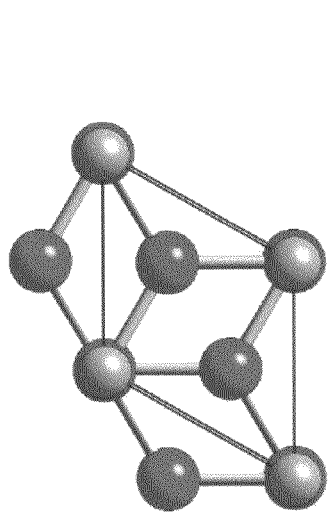 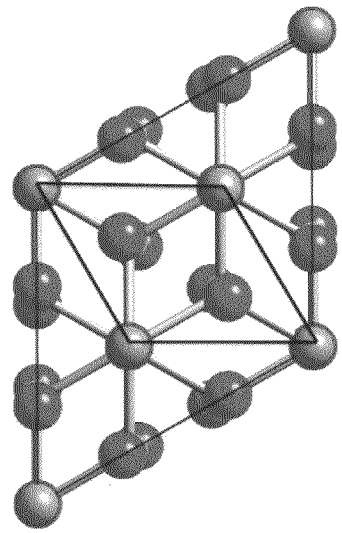
FIG. 2                FIG. 3

MATERIALS WITH TRIGONAL BIPYRAMIDAL COORDINATION AND METHODS OF MAKING THE SAME

CROSS REFERENCE TO RELATED APPLICATION

This application claims the benefit of the earlier filing date of U.S. Provisional Application No. 61/268,479, filed Jun. 11, 2009, which is incorporated herein by reference in its entirety.

ACKNOWLEDGMENT OF GOVERNMENT SUPPORT

This invention was made with government support under DMR0804167 awarded by National Science Foundation. The government has certain rights in the invention.

FIELD

This invention relates to the synthesis and use of novel materials, particularly chromophoric materials, such as materials useful for coloring paints, inks, including printing inks, plastics, glasses, ceramic products and decorative cosmetic preparations.

BACKGROUND

The development of the first known synthetic blue pigment, Egyptian blue ($CaCuSi_4O_{10}$), is believed to have been patronized by the Egyptian pharaohs, who promoted the advancement of pigment technologies for use in the arts. The subsequent quest for blue pigments has a history linked with powerful civilizations, such as the Han Chinese [Han blue ($BaCuSi_4O_{10}$)] and the Maya [Maya blue (indigo intercalated in magnesium aluminosilicate clays)]. Currently used blue inorganic pigments include cobalt blue ($CoAl_2O_4$), ultramarine ($Na_7Al_6Si_6O_{24}S_3$), Prussian blue ($Fe_4[Fe(CN)_6]_3$), and azurite ($Cu_3(CO_3)_2(OH)_2$).

All of these pigments, however, suffer from environmental and/or durability issues. Cobalt is considered to be highly toxic. Ultramarine and azurite are not stable with respect to heat and acidic conditions. Additionally, ultramarine manufacture produces a large amount of $SO_2$ emissions. Prussian blue liberates HCN under mild acidic conditions. Hence, there is a need for inorganic pigments, particularly intensely blue inorganic pigments, which are environmentally benign, earth-abundant and durable.

SUMMARY

Embodiments of compositions comprising materials, and embodiments of a method for making the materials, are disclosed. Embodiments of the disclosed material are chromophoric. Embodiments of the disclosed materials satisfy the general formula $AM_{1-x}M'_xM''_yO_{3+y}$, where A is Sc, Y, Gd, Tb, Dy, Ho, Er, Tm, Yb, Lu, Al, Zn, In, Ga, Ti, Sn, Fe, Mg, or a combination thereof; M is Sc, Y, Gd, Tb, Dy, Ho, Er, Tm, Yb, Lu, Al, Zn, In, Ga, Ti, Sn, Fe, Mg, or a combination thereof, or M is a 1:1 mixture of $M_A$ and $M_B$ cations where $M_A$ is Zn, Mg, Cu, or a combination thereof, and $M_B$ is Ti, Sn, or a combination thereof; M' is Mn, Fe, Al, Ga, In, or a combination thereof; M" is Mg, Zn, Cu, or a combination thereof; x is greater than 0.0 but less than or equal to 0.8; y is an integer from 0 to 15. In certain embodiments, at least one of M and M' comprises Al, Ga, or In. In particular embodiments, when $y=0$, M' is Mn and A is Y, Gd, Tb, Dy, Ho, Er, Tm, Yb, or Lu, then M is not Al.

In some embodiments, M' is a +3 cation and at least some of the $M'^{3+}$ cations are bound to oxygen in a trigonal bipyramidal coordination as $M'O_5$. In certain embodiments, M is a +3 cation, and at least some of the $M^{3+}$ cations are bound to oxygen in trigonal bipyramidal coordination as $MO_5$. In particular embodiments, M' is Mn, and Mn is bonded to oxygen with an apical Mn—O bond length of 1.80 Å to 1.95 Å.

In some embodiments, M' is Mn and the material satisfies the general formula $AM_{1-x}Mn_xM''_yO_{3+y}$. In certain embodiments, A is Lu, M is Ga, M' is Mn, and the material satisfies the general formula $LuGa_{1-x}Mn_xM''_yO_{3+y}$.

In some embodiments, M is Al, M' is Mn, and the material further includes carbonate. Such materials satisfy the formula $AAl_{1-x}Mn_xO_{3-z}(CO_3)_z$ where z is greater than 0.0 and less than or equal to 1.0.

In some embodiments, M' is Mn, y is 0, and the material satisfies the general formula $AM_{1-x}Mn_xO_3$. In certain embodiments, M is In and the material satisfies the formula $YIn_{1-x}Mn_xO_3$. In particular embodiments, the $YIn_{1-x}Mn_xO_3$ material has a surprisingly intense blue color.

In some embodiments, y is 0 and the material satisfies the formula $AM_{1-x}M'_xO_3$. Such materials form crystal structures having hexagonal layers comprising $MO_5$ and $M'O_5$ trigonal bipyramids alternating with layers of A cations. In certain embodiments, the crystal structure has a unit cell wherein edge a has a length of 3.50-3.70 Å and edge c has a length of 10-13 Å. In other embodiments, the crystal structure has a larger unit cell wherein edge a has a length of 5.5-7.0 Å and edge c has a length of 10-13 Å.

Exemplary chromophoric materials satisfying the formula $AM_{1-x}M'_xM''_yO_{3+y}$ include $YIn_{1-x}Mn_xO_3$, $DyIn_{1-x}Mn_xO_3$, $HoIn_{1-x}Mn_xO_3$, $ErIn_{1-x}Mn_xO_3$, $YFe_{1-x}In_xO_3$, $LuGa_{1-x}Mn_xMgO_4$, $ScAl_{1-x}Mn_xZnO_4$, $ScAl_{1-x}Mn_xMgO_4$, $InGa_{1-x}Mn_xZnO_4$, $InGa_{1-x}Mn_xMgO_4$, $ScGa_{1-x}Mn_xZnO_4$, $ScGa_{1-x}Mn_xMgO_4$, $LuGa_{1-x}Mn_xZnO_4$, $LuGa_{1-x}Mn_xMgO_4$, $LuGa_{1-x}Mn_xZn_2O_5$, $Y(Cu,Ti)_{1-x}Al_xO_3$, $Y(Cu,Ti)_{1-x}Ga_xO_3$, $Y(Cu,Ti)_{1-x}In_xO_3$, $Y(Cu,Ti)_{1-x}Fe_xO_3$, $Yb(Cu,Ti)_{1-x}Mn_xO_3$, $Lu(Cu,Ti)_{1-x}Mn_xO_3$, $Y(Fe,In)_{1-x}Mn_xO_3$, $Y(Mn,In)_{1-x}Fe_xO_3$, $(Y,Eu)Mn_{1-x}In_xO_3$, $In(In,Ga)_{1-x}Mn_xMgO_4$, and $Y(Ga,In)_{1-x}Mn_xO_3$.

In particular, exemplary chromophoric materials include $YIn_{0.95}Mn_{0.05}O_3$, $YIn_{0.9}Mn_{0.1}O_3$, $YIn_{0.85}Mn_{0.15}O_3$, $YIn_{0.8}Mn_{0.2}O_3$, $YIn_{0.75}Mn_{0.25}O_3$, $YIn_{0.7}Mn_{0.3}O_3$, $YIn_{0.65}Mn_{0.35}O_3$, $YIn_{0.6}Mn_{0.4}O_3$, $YIn_{0.55}Mn_{0.45}O_3$, $YIn_{0.5}Mn_{0.5}O_3$, $YIn_{0.25}Mn_{0.75}O_3$, $YIn_{0.1}Mn_{0.9}O_3$, $DyIn_{0.9}Mn_{0.1}O_3$, $DyIn_{0.8}Mn_{0.2}O_3$, $DyIn_{0.7}Mn_{0.3}O_3$, $DyIn_{0.6}Mn_{0.4}O_3$, $DyIn_{0.5}Mn_{0.5}O_3$, $DyIn_{0.4}Mn_{0.6}O_3$, $DyIn_{0.3}Mn_{0.7}O_3$, $DyIn_{0.2}Mn_{0.8}O_3$, $HoIn_{0.9}Mn_{0.1}O_3$, $HoIn_{0.8}Mn_{0.2}O_3$, $HoIn_{0.7}Mn_{0.3}O_3$, $HoIn_{0.5}Mn_{0.5}O_3$, $HoIn_{0.3}Mn_{0.7}O_3$, $HoIn_{0.2}Mn_{0.8}O_3$, $HoIn_{0.1}Mn_{0.9}O_3$, $ErIn_{0.9}Mn_{0.1}O_3$, $ErIn_{0.8}Mu_{0.2}O_3$, $ErIn_{0.5}Mn_{0.5}O_3$, $ErIn_{0.2}Mn_{0.8}O_3$, $YAl_{0.1}Cu_{0.45}Ti_{0.45}O_3$, $YGa_{0.1}Cu_{0.45}Ti_{0.45}O_3$, $YIn_{0.1}Cu_{0.45}Ti_{0.45}O_3$, $YFe_{0.1}Cu_{0.45}Ti_{0.45}O_3$, $YFe_{0.2}Cu_{0.4}Ti_{0.4}O_3$, $YMn_{0.1}Cu_{0.45}Ti_{0.45}O_3$, $YMn_{0.2}Cu_{0.4}Ti_{0.4}O_3$, $YMn_{0.3}Cu_{0.35}Ti_{0.35}O_3$, $YMn_{0.4}Cu_{0.3}Ti_{0.3}O_3$, $YMn_{0.5}Cu_{0.25}Ti_{0.25}O_3$, $YMn_{0.6}Cu_{0.2}Ti_{0.2}O_3$, $YMn_{0.7}Cu_{0.15}Ti_{0.15}O_3$, $YMn_{0.8}Cu_{0.1}Ti_{0.1}O_3$, $YMn_{0.9}Cu_{0.05}Ti_{0.05}O_3$, $LuMn_{0.5}Cu_{0.25}Ti_{0.25}O_3$, $YbMn_{0.5}Cu_{0.25}Ti_{0.25}O_3$, $YGa_{0.1}In_{0.8}Mn_{0.1}O_3$, $YGa_{0.1}In_{0.7}Mn_{0.2}O_3$, $YGa_{0.1}In_{0.6}Mn_{0.3}O_3$, $YFe_{0.1}In_{0.8}Mn_{0.1}O_3$, $YFe_{0.2}In_{0.7}Mn_{0.1}O_3$, $YFe_{0.3}In_{0.6}Mn_{0.1}O_3$, $YFe_{0.1}In_{0.7}Mn_{0.2}O_3$, $YFe_{0.2}In_{0.6}Mn_{0.2}O_3$, $YFe_{0.3}In_{0.5}Mn_{0.2}O_3$, $YFe_{0.1}In_{0.6}Mn_{0.3}O_3$, $YFe_{0.2}In_{0.5}Mn_{0.3}O_3$,
$YFe_{0.3}In_{0.4}Mn_{0.3}O_3$, $YFe_{0.1}In_{0.5}Mn_{0.4}O_3$,
$YFe_{0.2}In_{0.4}Mn_{0.4}O_3$, $YFe_{0.3}In_{0.3}Mn_{0.4}O_3$, $YFe_{0.1}In_{0.9}O_3$,
$YFe_{0.2}In_{0.8}O_3$, $YFe_{0.3}In_{0.7}O_3$, $YFe_{0.7}In_{0.3}O_3$, $YFe_{0.8}In_{0.2}O_3$,
$YFe_{0.9}In_{0.1}O_3$, $YSc_{0.1}Mn_{0.9}O_3$, $YSc_{0.2}Mn_{0.8}O_3$,
$Y_{1.95}Eu_{0.05}Mn_{0.25}In_{0.75}O_3$, $Y_{1.9}Eu_{0.1}Mn_{0.25}In_{0.75}O_3$,
$YAl_{0.20}Mn_{0.80}O_{3-z}(CO_3)_z$, $YAl_{0.30}Mn_{0.70}O_{3-z}(CO_3)_z$,
$YAl_{0.40}Mn_{0.60}O_{3-z}(CO_3)_z$, $YAl_{0.50}Mn_{0.50}O_{3-z}(CO_3)_z$,
$YAl_{0.60}Mn_{0.40}O_{3-z}(CO_3)_z$, $YAl_{0.70}Mn_{0.30}O_{3-z}(CO_3)_z$,
$YAl_{0.80}Mn_{0.20}O_{3-z}(CO_3)_z$, $LuGa_{0.99}Mn_{0.01}MgO_4$,
$LuGa_{0.97}Mn_{0.03}MgO_4$, $LuGa_{0.95}Mn_{0.05}MgO_4$,
$LuGa_{0.90}Mn_{0.10}MgO_4$, $LuGa_{0.85}Mn_{0.15}MgO_4$,
$LuGa_{0.97}Mn_{0.03}ZnO_4$, $LuGa_{0.95}Mn_{0.05}ZnO_4$,
$ScAl_{0.99}Mn_{0.01}MgO_4$, $ScAl_{0.95}Mn_{0.05}MgO_4$,
$ScAl_{0.90}Mn_{0.95}MgO_4$, $ScAl_{0.85}Mn_{0.15}MgO_4$,
$ScAl_{0.95}Mn_{0.05}ZnO_4$, $InGa_{0.97}Mn_{0.03}ZnO_4$,
$InGa_{0.97}Mn_{0.03}ZnO_4$, $InGa_{0.95}Mn_{0.05}ZnO_4$,
$InGa_{0.95}Mn_{0.05}MgO_4$, $ScGa_{0.95}Mn_{0.05}ZnO_4$,
$ScGa_{0.95}Mn_{0.05}MgO_4$, $LuGa_{0.99}Mn_{0.01}ZnO_4$,
$LuGa_{0.95}Mn_{0.05}ZnO_4$, $In(In_{0.2}Ga_{0.8})_{0.95}Mn_{0.05}MgO_4$,
$LuGa_{0.99}Mn_{0.01}Zn_2O_5$, $LuGa_{0.95}Mn_{0.05}Zn_2O_5$, and
$In(In_{0.2}Ga_{0.8})_{0.95}Mn_{0.05}MgO_4$.

Also disclosed herein are compositions including the chromophoric materials. In some embodiments, the composition includes a chromophoric material according to the formula $AM_{1-x}M'_xM''_yO_{3+y}$, and at least one additional component. In some embodiments, the composition is a paint or an ink, and the additional component is a binder, a solvent, a catalyst, a thickener, a stabilizer, an emulsifier, a texturizer, an adhesion promoter, a UV stabilizer, a flattener, a preservative, or each and any combination thereof. In some embodiments, the composition is a colored glass, and the additional component is an oxide of silicon, boron, germanium, or a combination thereof. In certain embodiments, the chromophoric material is $YIn_{1-x}Mn_xO_3$, and x is greater than 0.0 and less than 0.75.

In some embodiments, the composition further comprises at least one additional chromophoric material. In particular embodiments, the additional chromophoric material also satisfies the formula $AM_{1-x}M'_xM''_yO_{3+y}$.

Embodiments of a method for making the disclosed materials are disclosed. In some embodiments, the method comprises providing powders comprising metals desired in the material, combining the powders in stoichiometric quantities to achieve a desired final ratio of the metals in the material, and heating the powders at an effective temperature and for an effective period of time to produce the desired materials. In some embodiments, the powders were heated at a temperature of from about 700° C. to about 1500° C. for about 2 hours to about 20 hours to produce the material. In certain embodiments, the powders are metal oxides or metal nitrates. In some embodiments, after combining the powders in stoichiometric quantities, the powders are pressed into a pellet before heating. In particular embodiments, the pellet is ground after heating to produce a powder, the powder is re-pressed into a pellet, and the pellet is heated again at a temperature of from about 700° C. to about 1500° C. for about 2 hours to about 20 hours.

Also disclosed are embodiments of a method for varying color in a material having a formula $AM_{1-x}M'_xM''_yO_{3+y}$. In certain embodiments, the material has a color that varies along a color continuum as the value of x increases. Thus, the material's color can be varied by providing powders comprising metals desired in the material, selecting a value of x to provide a desired color along the color continuum, combining the powders in stoichiometric quantities according to the value of x, and heating the powders at a temperature of about 700° C. to about 1500° C. for about 2 hours to about 20 hours to produce the material with the desired color.

Embodiments of a method for making the disclosed compositions are disclosed. In some embodiments, the method comprises providing a material that satisfies the formula $AM_{1-x}M'_xM''_yO_{3+y}$, and combining the material with at least one additional component to produce the composition. In certain embodiments, the composition is a paint, an ink, a glass, a plastic, a ceramic glaze, or a cosmetic preparation.

In some embodiments, providing the material includes providing powders comprising metals desired in the material, combining the powders in stoichiometric quantities to achieve a desired final ratio of the metals in the material, and heating the powders at an effective temperature and for an effective period of time to produce the desired materials. In some embodiments, the powders were heated at a temperature of from about 700° C. to about 1500° C. for about 2 hours to about 20 hours to produce the material.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A and 1B are schematic diagrams of the trigonal bipyramidal structures of (1A) $YMnO_3$ and (1B) $LuGaMgO_4$ with Mn or Mg/Ga shown as blue trigonal bipyramids, brown Y or Lu atoms, and turquoise O atoms. FIG. 1B is also consistent with the structure of $YbFe_2O_4$ with Fe as blue trigonal bipyramids, brown Yb atoms, and turquoise O atoms.

FIGS. 2-5 are schematic diagrams of trigonal bipyramidal structures according to the general formula $AM_{1-x}M'_xO_3$, with red O atoms, light blue A atoms, and pink M/M' atoms. FIGS. 2 and 3 are shown from a top perspective, looking down the c-axis. FIGS. 4 and 5 are shown from a front perspective, with the c-axis being vertical.

DETAILED DESCRIPTION

Figure 4:
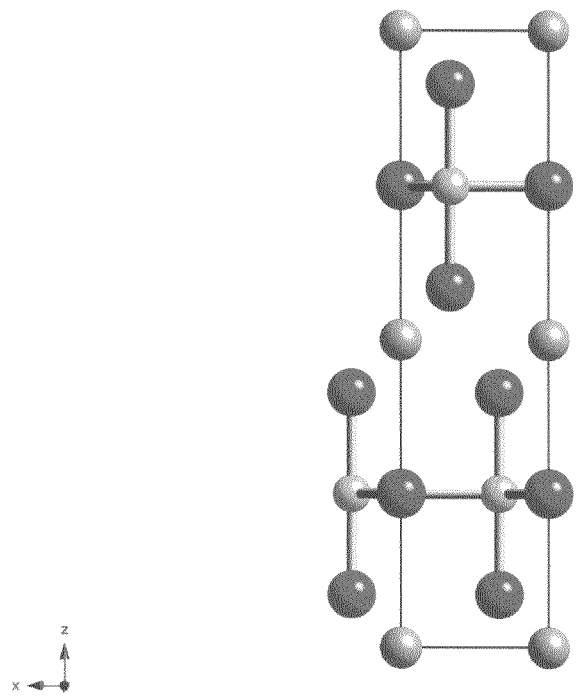

The present disclosure concerns embodiments of materials, particularly chromophoric materials. Certain disclosed embodiments comprise a metal selected from Mn, Fe, Al, Ga, In, or a combination thereof, bound to oxygen in a trigonal bipyramidal configuration. Compositions comprising the materials also are disclosed. In particular embodiments, the metal is Mn, and the material has a blue color. Embodiments of a method for making the materials also are disclosed.

Manganese is relatively abundant, constituting about 0.085% of the earth's crust. Among the heavy metals, only iron is more abundant. Manganese-containing materials displaying a variety of colors are known. The observed color of these compounds is determined by the oxidation state of manganese, commonly +II, +III, +IV, +VI and +VII, and the associated anions. For example, permanganate (+VII oxidation state) compounds are purple. Manganese (II) compounds tend to be pink or red in color, although manganese (II) oxide is green. Examples of blue manganese compounds, especially bright blue manganese compounds, are less commonly observed. For example, hypomanganate, Mn(V), salts are bright blue, but are unstable, and Manganese Blue, which is a barium Mn(VI) sulfate is highly toxic.

The inventors have discovered that a surprisingly intense, bright-blue color is obtained when $Mn^{3+}$ is introduced into the trigonal bipyramidal sites of metal oxides.

I. Terms and Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

A chromophore is the portion, or moiety, of a molecule that is responsible for the molecule's color. A metal-complex chromophore is believed to arise from the splitting of d-orbitals when a metal (e.g., a transition metal) binds to ligands. Visible light that hits the chromophores is absorbed by exciting an electron from its ground state into an excited state.

CIE L*a*b* (CIELAB) is a color space (i.e., a model representing colors as an ordered list of three numerical values) specified by the International Commission on Illumination (Commission Internationale d'Eclairage, CIE). The three coordinates represent the lightness of the color (L*=0=black, L*=100=diffuse white), its position between red/magenta and green (a*–negative values indicate green, while positive values indicate magenta, and its position between yellow and blue (b*–negative values indicate blue and positive values indicate yellow).

Ferroelectricity is a property of certain nonconducting crystals that exhibit spontaneous electric polarization, making one side of the crystal positive and the opposite side negative, that can be reversed in direction by the application of an external electric field.

Gloss is an optical property based on the interaction of light with physical characteristics of a surface; the level of specular (mirror-like) reflection of light from a surface.

A hexagonal unit cell is one of the seven crystal systems with the general unit cell geometry $a=b \neq c$; $\alpha=\beta=90°$ and $\gamma=120°$. Structures of the compositions disclosed herein are referred to as hexagonal. Strictly speaking, those with an odd value for y (i.e., 1, 3, 5, etc.) are rhombohedral. Rhombohedral unit cells are most frequently described using a hexagonal unit cell, but they can also be described as a cell where $a=b=c$ and $\alpha=\beta=\gamma$. For the single layer structure (y=0), both the small and large cell structures are true hexagonal unit cells. More information on the rhombohedral-hexagonal transformation can be found in textbooks dealing with crystallography (e.g., "Elements of X-ray Diffraction", by B. D. Cullity, Addison-Wesley, 1978; pp. 504-505).

Masstone is the undiluted color of a pigment or a pigmented paint, e.g., the color it appears when applied thickly and no other color is seen beneath it.

Opacity, or hiding power, refers to the ability of a pigment to obscure a black design painted on a white background.

A pigment is a substance, usually in the form of a dry powder, that imparts color to another substance or mixture.

A solid solution is formed when at least one solid component is molecularly dispersed within another solid component, resulting in a homogeneous or substantially homogeneous solid material. A solid solution may be formed, for example, by completely or substantially completely dissolving two solid components in a liquid solvent and then removing the liquid solvent to produce the solid solution.

A tint is a color obtained by adding white to a colored pigment.

Total solar reflectance (TSR) is a measure of the amount of incident terrestrial solar energy reflected from a given surface. For example, white coatings exhibit a TSR of 75% or greater, whereas black coatings may have a total TSR as low as 3%.

Trigonal bipyramidal geometry is found when a central atom in a molecule forms bonds to five peripheral atoms at the corners of a trigonal dipyramid. Three of the atoms are arranged in a planar triangle around the central atom with a bond angle of 120 degrees between the peripheral atoms; these atoms are called equatorial, or basal, atoms. The remaining two atoms are located above and below the central atom, and are called axial, or apical, atoms. There is a bond angle of 90 degrees between the axial and equatorial atoms. One example of a trigonal bipyramidal molecule is $PF_5$.

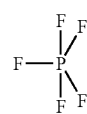

Figure 6:
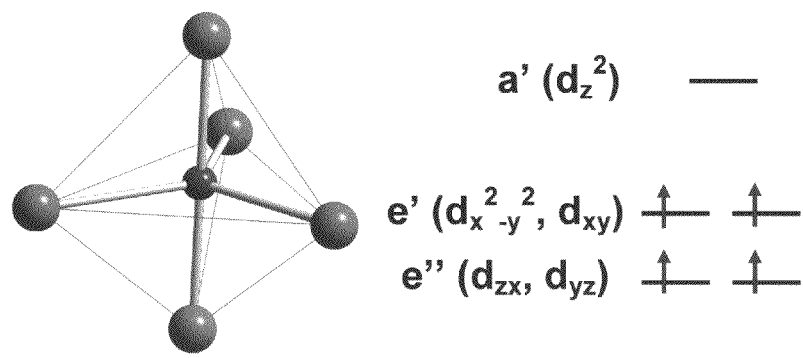
FIG. 6 is a schematic diagram of the energy levels for Mn 3d orbitals.

FIG. 6 also depicts a trigonal bipyramidal molecule. Some crystals have trigonal bipyramidal geometry. In the crystal, the peripheral atoms may be shared by more than one central atom as shown in FIGS. 1A-1B.

II. Materials with Trigonal Bipyramidal Coordination and Compositions Thereof Embodiments of compositions comprising materials are disclosed. In preferred embodiments, the material is chromophoric. In the disclosed embodiments, the compositions include at least one chromophoric material comprising a metal selected from Mn, Fe, Al, Ga, In, or a combination thereof bound to oxygen in a trigonal bipyramidal configuration. In the disclosed embodiments, oxygen atoms occupy all five sites coordinated to the central metal in the trigonal bipyramid.

A. Materials

A person of ordinary skill in the art will understand that the following general formulas are compositional formulas and do not necessarily imply chemical structure and/or connectivity. As such, the order of individual components in the general formulas may be rearranged when writing specific formulas to represent embodiments of the disclosed materials.

Embodiments of the disclosed compositions comprise a material according to general Formula 1:

$$AM_{1-x}M'_xM''_yO_{3+y} \qquad \text{Formula 1}$$

With reference to Formula 1, A and M independently are selected from Sc, Y, Gd, Tb, Dy, Ho, Er, Tm, Yb, Lu, Al, Ga, In, Zn, Ti, Sn, Fe, Mg, or a combination thereof; alternatively, M is a 1:1 mixture of $M_A$ and $M_B$ cations where $M_A$ is Zn, Mg, or Cu, and $M_B$ is Ti or Sn; M' is Mn, Fe, Al, Ga, In, or a combination thereof; M" is Mg, Zn, Cu, or a combination thereof; x is greater than 0.0 but less than 1.0, and y is 0 or a positive integer. In some embodiments, y is an integer from 0 to 15 (i.e., y is 0, 1, 2, 3, 4, 5, 6, 7, 8, 9, 10, 11, 12, 13, 14, or 15). In particular embodiments, M and M' are cations with a +3 oxidation state, and at least a portion of M and M' cations are bound to oxygen in trigonal bipyramidal coordination.

In some embodiments, the material is chromophoric. In exemplary embodiments, the material has a color that varies along a color continuum as the value of x increases. For example, the material may have a color darkens as the value of x increases.

In some embodiments, at least one of M and M' comprises a metal selected from Al, Ga, and In. In certain embodiments, M is not Al when y is 0, M' is Mn, and A is Sc, Y, Gd, Tb, Dy, Ho, Er, Tm, Yb, Lu.

In some embodiments, A is Sc, Y, Gd, Tb, Dy, Ho, Er, Tm, Yb, Lu, or a combination thereof; M is Al, Ga, In, Fe, or a combination thereof; alternatively M is a 1:1 mixture of Cu and Ti; M' is Mn, Fe, Al, Ga, In, or a combination thereof; M" is Mg, Zn, or a combination thereof; x is greater than 0.0 but less than or equal to 0.8; and y is 0, 1, or 2.

In certain embodiments, M, M', and/or M" may be a combination of the recited elements. For instance, M may be a mixture of Fe and In, e.g., $A(Fe,In)_{1-x}M'_xM''_yO_{3+y}$. One example of such a material is $YFe_{0.1}In_{0.8}Mn_{0.1}O_3$, where A is Y, M is ($Fe_{0.1}In_{0.8}$), M' is Mn, x is 0.1, and y is 0. Another example is $In(In_{0.2}Ga_{0.76})Mn_{0.04}MgO_4$, where A is In, M is ($In_{0.2}Ga_{0.76}$), M' is Mn, M" is Mg, x is 0.04, and y is 1; this composition also can be represented as $In_{1.2}Ga_{0.76}Mn_{0.04}MgO_4$.

In some embodiments, the compositions comprise a manganese (III) material according to Formula 2.

$$AM_{1-x}Mn_xM''_yO_{3+y} \qquad \text{Formula 2}$$

With reference to Formula 2, A is Y, Sc, Gd, Tb, Dy, Ho, Er, Tm, Yb, Lu, or a combination thereof; M is a cation in trigonal bipyramidal coordination, where M selected from Al, Ga, In, Fe, and combinations thereof; alternatively, M is a 1:1 mixture of $M_A$ and $M_B$ cations where $M_A$ is Zn, Mg, Cu, or a combination thereof, and $M_B$ is Ti, Sn, or a combination thereof; M" is Zn, Mg, Cu, or a combination thereof; x is greater than 0 and less than 1.0; and y is an integer number ranging from 0 to 6.

In other embodiments, the compositions comprise a manganese (III) material according to Formula 3.

$$LuGa_{1-x}Mn_xM''_yO_{3+y} \qquad \text{Formula 3}$$

With reference to Formula 4, M" is Zn, Mg, Cu, or a combination thereof, x is greater than 0 and less than 1.0, and y is an integer number ranging from 0 to 6.

In some embodiments, y is 0 and the compositions comprise a manganese (III) material according to Formula 4.

$$AM_{1-x}Mn_xO_3 \qquad \text{Formula 4}$$

With reference to Formula 4, x is greater than 0.0 but less than 1.0, and A and M independently are selected from Y, Gd, Tb, Dy, Ho, Er, Tm, Yb, Lu, Al, Ga, In, Zn, Ti, Sn, Fe, Mg, and combinations thereof In some embodiments, A and M independently are selected from the group consisting of Y, Al, In, Ga, and combinations thereof.

In certain embodiments where M is aluminum, the compositions further comprise carbonate ($CO_3^{2-}$) as shown in Formula 5:

$$AAl_{1-x}M'_xO_{3-z}(CO_3)_z \qquad \text{Formula 5}$$

With reference to Formula 5, x is greater than 0.0 but less than 1.0, z is greater than 0.0 and less than or equal to 1.0; A is Y, Gd, Tb, Dy, Ho, Er, Tm, Yb, Lu, Al, Ga, In, Zn, Ti, Sn, Fe, Mg, and combinations thereof, and M' is Mn, Fe, Ga, In, or a combination thereof. One example is $YAl_{0.60}Mn_{0.40}O_{3-z}(CO_3)_z$. The presence of carbonate arises from the use of organic compounds (e.g., citric acid; see Examples 70-76) when synthesizing $AAlO_3$. The organic matter decomposes during synthesis, producing a $CO_2$-rich atmosphere and promoting carbonate formation. In the absence of M' (x=0), $AAlO_2CO_3$ is produced. As aluminum content decreases, carbonate content also decreases and becomes zero when x=1.0. However, when x is greater than 0.0 and less than 1.0, the carbonate content z of the compound is variable for any given value of x. Where $CO_3^{2-}$ replaces $O^{2-}$ in the crystal structure, the adjacent cation loses its trigonal bipyramidal coordination, and is thought to assume a distorted octahedral conformation. Other cations in the crystal structure retain the trigonal bipyramidal coordination.

In particular embodiments, the compositions comprise a manganese (III) material according to Formula 6.

$$YIn_{1-x}Mn_xO_3 \qquad \text{Formula 6}$$

With reference to Formula 6, x is greater than 0.0 but less than 1.0.

Compositions comprising solid solutions of materials according to Formulas 1 through 7 are chromophoric. Table 1 lists representative working embodiments of materials according to Formulas 1 through 7, along with their respective colors and crystal structures.

TABLE 1

| Composition | Color | Structure |
| --- | --- | --- |
| $YInO_3$ | White/Lt. Yellow | Hexagonal Single layer |
| $YIn_{0.95}Mn_{0.05}O_3$ | Sky Blue | Hexagonal Single layer |
| $YIn_{0.9}Mn_{0.1}O_3$ | Bright Blue | Hexagonal Single layer |
| $YIn_{0.85}Mn_{0.15}O_3$ | Bright Blue | Hexagonal Single layer |

TABLE 1-continued

| Composition | Color | Structure |
|---|---|---|
| $YIn_{0.8}Mn_{0.2}O_3$ | Bright Blue | Hexagonal Single layer |
| $YIn_{0.75}Mn_{0.25}O_3$ | Royal Blue | Hexagonal Single layer |
| $YIn_{0.7}Mn_{0.3}O_3$ | Royal Blue | Hexagonal Single layer |
| $YIn_{0.65}Mn_{0.35}O_3$ | Navy Blue | Hexagonal Single layer |
| $YIn_{0.6}Mn_{0.4}O_3$ | Navy Blue | Hexagonal Single layer |
| $YIn_{0.55}Mn_{0.45}O_3$ | Navy Blue | Hexagonal Single layer |
| $YIn_{0.5}Mn_{0.5}O_3$ | Dark Navy Blue | Hexagonal Single layer |
| $YIn_{0.25}Mn_{0.75}O_3$ | Black | Hexagonal Single layer |
| $YIn_{0.1}Mn_{0.9}O_3$ | Black | Hexagonal Single layer |
| $DyIn_{0.9}Mn_{0.1}O_3$ | Bright Blue | Hexagonal Single layer |
| $DyIn_{0.8}Mn_{0.2}O_3$ | Royal Blue | Hexagonal Single layer |
| $DyIn_{0.7}Mn_{0.3}O_3$ | Dark Royal Blue | Hexagonal Single layer |
| $DyIn_{0.6}Mn_{0.4}O_3$ | Dark Navy Blue | Hexagonal Single layer |
| $DyIn_{0.5}Mn_{0.5}O_3$ | Dark Navy Blue/Black | Hexagonal Single layer |
| $DyIn_{0.4}Mn_{0.6}O_3$ | Black | Hexagonal Single layer |
| $DyIn_{0.3}Mn_{0.7}O_3$ | Black | Hexagonal Single layer |
| $DyIn_{0.2}Mn_{0.8}O_3$ | Black | Hexagonal Single layer |
| $HoIn_{0.9}Mn_{0.1}O_3$ | Bright Blue | Hexagonal Single layer |
| $HoIn_{0.8}Mn_{0.2}O_3$ | Royal Blue | Hexagonal Single layer |
| $HoIn_{0.7}Mn_{0.3}O_3$ | Dark Royal Blue | Hexagonal Single layer |
| $HoIn_{0.5}Mn_{0.5}O_3$ | Dark Navy Blue/Black | Hexagonal Single layer |
| $HoIn_{0.3}Mn_{0.7}O_3$ | Black | Hexagonal Single layer |
| $HoIn_{0.2}Mn_{0.8}O_3$ | Black | Hexagonal Single layer |
| $HoIn_{0.1}Mn_{0.9}O_3$ | Black | Hexagonal Single layer |
| $ErIn_{0.9}Mn_{0.1}O_3$ | Flat Royal Blue | Hexagonal Single layer |
| $ErIn_{0.8}Mn_{0.2}O_3$ | Royal Blue | Hexagonal Single layer |
| $ErIn_{0.5}Mn_{0.5}O_3$ | Dark Navy Blue | Hexagonal Single layer |
| $ErIn_{0.2}Mn_{0.8}O_3$ | Black | Hexagonal Single layer |
| $YCu_{0.5}Ti_{0.5}O_3$ | Yellow-green | Hexagonal Single layer |
| $YAl_{0.1}Cu_{0.45}Ti_{0.45}O_3$ | Bright green | Hexagonal Single layer |
| $YGa_{0.1}Cu_{0.45}Ti_{0.45}O_3$ | Bright green | Hexagonal Single layer |
| $YIn_{0.1}Cu_{0.45}Ti_{0.45}O_3$ | Bright green | Hexagonal Single layer |
| $YFe_{0.1}Cu_{0.45}Ti_{0.45}O_3$ | Light Brown | Hexagonal Single layer |
| $YFe_{0.2}Cu_{0.4}Ti_{0.4}O_3$ | Brown | Hexagonal Single layer |
| $YMn_{0.1}Cu_{0.45}Ti_{0.45}O_3$ | Black | Hexagonal Single layer |
| $YMn_{0.2}Cu_{0.4}Ti_{0.4}O_3$ | Black | Hexagonal Single layer |
| $YMn_{0.3}Cu_{0.35}Ti_{0.35}O_3$ | Black | Hexagonal Single layer |
| $YMn_{0.4}Cu_{0.3}Ti_{0.3}O_3$ | Black | Hexagonal Single layer |
| $YMn_{0.5}Cu_{0.25}Ti_{0.25}O_3$ | Black | Hexagonal Single layer |
| $YMn_{0.6}Cu_{0.2}Ti_{0.2}O_3$ | Black | Hexagonal Single layer |
| $YMn_{0.7}Cu_{0.15}Ti_{0.15}O_3$ | Black | Hexagonal Single layer |
| $YMn_{0.8}Cu_{0.1}Ti_{0.1}O_3$ | Black | Hexagonal Single layer |
| $YMn_{0.9}Cu_{0.05}Ti_{0.05}O_3$ | Black | Hexagonal Single layer |
| $LuMn_{0.5}Cu_{0.25}Ti_{0.25}O_3$ | Black | Hexagonal Single layer |
| $YbMn_{0.5}Cu_{0.25}Ti_{0.25}O_3$ | Black | Hexagonal Single layer |
| $YGa_{0.1}In_{0.8}Mn_{0.1}O_3$ | Bright Blue | Hexagonal Single layer |
| $YGa_{0.1}In_{0.7}Mn_{0.2}O_3$ | Bright Blue | Hexagonal Single layer |
| $YGa_{0.1}In_{0.6}Mn_{0.3}O_3$ | Bright Blue | Hexagonal Single layer |
| $YFe_{0.1}In_{0.8}Mn_{0.1}O_3$ | Blue | Hexagonal Single layer |
| $YFe_{0.2}In_{0.7}Mn_{0.1}O_3$ | Dark Blue | Hexagonal Single layer |
| $YFe_{0.3}In_{0.6}Mn_{0.1}O_3$ | Grey/Blue | Hexagonal Single layer |
| $YFe_{0.1}In_{0.7}Mn_{0.2}O_3$ | Blue | Hexagonal Single layer |
| $YFe_{0.2}In_{0.6}Mn_{0.2}O_3$ | Dark Blue | Hexagonal Single layer |
| $YFe_{0.3}In_{0.5}Mn_{0.2}O_3$ | Grey | Hexagonal Single layer |
| $YFe_{0.1}In_{0.6}Mn_{0.3}O_3$ | Dark Blue | Hexagonal Single layer |
| $YFe_{0.2}In_{0.5}Mn_{0.3}O_3$ | Dark Blue | Hexagonal Single layer |
| $YFe_{0.3}In_{0.4}Mn_{0.3}O_3$ | Dark Blue/Black | Hexagonal Single layer |
| $YFe_{0.1}In_{0.5}Mn_{0.4}O_3$ | Dark Blue | Hexagonal Single layer |
| $YFe_{0.2}In_{0.4}Mn_{0.4}O_3$ | Dark Blue/Black | Hexagonal Single layer |
| $YFe_{0.3}In_{0.3}Mn_{0.4}O_3$ | Black | Hexagonal Single layer |
| $YFe_{0.1}In_{0.9}O_3$ | Light Yellow | Hexagonal Single layer |
| $YFe_{0.2}In_{0.8}O_3$ | Light Orange | Hexagonal Single layer |
| $YFe_{0.3}In_{0.7}O_3$ | Orange | Hexagonal Single layer |
| $YFe_{0.7}In_{0.3}O_3$ | Light Brown | Hexagonal Single layer |
| $YFe_{0.8}In_{0.2}O_3$ | Brown | Hexagonal Single layer |
| $YFe_{0.9}In_{0.1}O_3$ | Brown | Hexagonal Single layer |
| $YSc_{0.1}Mn_{0.9}O_3$ | Black | Hexagonal Single layer |
| $YSc_{0.2}Mn_{0.8}O_3$ | Black | Hexagonal Single layer |
| $Y_{1.95}Eu_{0.05}Mn_{0.25}In_{0.75}O_3$ | Bright Blue | Hexagonal Single layer |
| $Y_{1.9}Eu_{0.1}Mn_{0.25}In_{0.75}O_3$ | Bright Blue | Hexagonal Single layer |
| $YAl_{0.20}Mn_{0.80}O_{3-z}(CO_3)_z$ | Dark blue | Hexagonal Single layer |
| $YAl_{0.30}Mn_{0.70}O_{3-z}(CO_3)_z$ | Dark blue | Hexagonal Single layer |
| $YAl_{0.40}Mn_{0.60}O_{3-z}(CO_3)_z$ | Dark blue | Hexagonal Single layer |
| $YAl_{0.50}Mn_{0.50}O_{3-z}(CO_3)_z$ | Dark blue | Hexagonal Single layer |
| $YAl_{0.60}Mn_{0.40}O_{3-z}(CO_3)_z$ | Dark blue | Hexagonal Single layer |
| $YAl_{0.70}Mn_{0.30}O_{3-z}(CO_3)_z$ | Blue/grey | Hexagonal Single layer |
| $YAl_{0.80}Mn_{0.20}O_{3-z}(CO_3)_z$ | Blue/grey | Hexagonal Single layer |
| $LuGa_{0.99}Mn_{0.01}MgO_4$ | Light blue/purple | Hexagonal Double layer |
| $LuGa_{0.97}Mn_{0.03}MgO_4$ | Blue/purple | Hexagonal Double layer |
| $LuGa_{0.95}Mn_{0.05}MgO_4$ | Blue/purple | Hexagonal Double layer |
| $LuGa_{0.90}Mn_{0.10}MgO_4$ | Blue/purple | Hexagonal Double layer |
| $LuGa_{0.85}Mn_{0.15}MgO_4$ | Dark blue/purple | Hexagonal Double layer |
| $LuGa_{0.97}Mn_{0.03}ZnO_4$ | Blue/purple | Hexagonal Double layer |
| $LuGa_{0.95}Mn_{0.05}ZnO_4$ | Blue/purple | Hexagonal Double layer |
| $ScAl_{0.99}Mn_{0.01}MgO_4$ | Purple | Hexagonal Double layer |
| $ScAl_{0.95}Mn_{0.05}MgO_4$ | Purple | Hexagonal Double layer |
| $ScAl_{0.90}Mn_{0.95}MgO_4$ | Purple | Hexagonal Double layer |
| $ScAl_{0.85}Mn_{0.15}MgO_4$ | Purple | Hexagonal Double layer |
| $ScAl_{0.95}Mn_{0.05}ZnO_4$ | Blue | Hexagonal Double layer |
| $InGa_{0.97}Mn_{0.03}ZnO_4$ | Green | Hexagonal Double layer |
| $InGa_{0.97}Mn_{0.03}ZnO_4$ | Green | Hexagonal Double layer |
| $InGa_{0.95}Mn_{0.05}ZnO_4$ | Green | Hexagonal Double layer |
| $InGa_{0.95}Mn_{0.05}MgO_4$ | Blue | Hexagonal Double layer |
| $ScGa_{0.95}Mn_{0.05}ZnO_4$ | Blue | Hexagonal Double layer |
| $ScGa_{0.95}Mn_{0.05}MgO_4$ | Blue | Hexagonal Double layer |
| $LuGa_{0.99}Mn_{0.01}ZnO_4$ | Blue | Hexagonal Double layer |
| $LuGa_{0.95}Mn_{0.05}ZnO_4$ | Blue | Hexagonal Double layer |
| $In(In_{0.2}Ga_{0.8})_{0.95}Mn_{0.05}MgO_4$ | Blue | Hexagonal Double layer |
| $LuGa_{0.99}Mn_{0.01}Zn_2O_5$ | Blue | Hexagonal Triple layer |
| $LuGa_{0.95}Mn_{0.05}Zn_2O_5$ | Blue | Hexagonal Triple layer |
| $In(In_{0.2}Ga_{0.8})_{0.95}Mn_{0.05}MgO_4$ | Blue | Hexagonal Double layer |

Materials according to Formula 6 exhibit a surprisingly intense and bright blue color despite the fact that $YInO_3$ (x=0) and $YMnO_3$ (x=1) are white and black, respectively. Indeed, a blue color is observed throughout much of the $YIn_{1-x}Mn_xO_3$ solid solution range. The key to this color appears to be $Mn^{3+}$ in trigonal bipyramidal coordination to oxygen. Without being bound by any particular theory, it is believed that the blue color arises from crystal field splitting associated with the trigonal bipyramidal coordination and is surprisingly intense due to a very short apical Mn—O bond, e.g., 1.80-1.95 Å, or 1.85-1.90 Å. The inventors unexpectedly discovered that such an intense and bright blue color is characteristic of many layered oxides containing $Mn^{3+}$ in trigonal bipyramidal coordination.

B. Compositions

The present disclosure is also directed to compositions comprising a material or materials satisfying at least one of Formulas 1 through 6. Such compositions include, for example, and without limitation: combinations of materials satisfying at least one of Formulas 1 through 6 in combination with another material or materials that facilitate pigmenting applications. Compositions for pigmenting applications include paints, inks, including printing inks, plastics, glasses, ceramic products, and decorative cosmetic preparations.

Suitable additional materials for use in paints and inks include, for example, binders, solvents, and additives such as catalysts, thickeners, stabilizers, emulsifiers, texturizers, adhesion promoters, UV stabilizers, flatteners (i.e., de-glossing agents), preservatives, and other additives known to those skilled in the art of pigmenting applications. In some embodiments, the compositions may include more than one material satisfying at least one of Formulas 1-6. In other embodiments, the compositions may include a material satisfying at least one of Formulas 1-6 in combination with another pigment.

Suitable additional materials for use in glass products include, for example, network formers (e.g., oxides of silicon, boron, germanium) to form a highly crosslinked network of chemical bonds, modifiers (e.g., calcium, lead, lithium, sodium, potassium) that alter the network structure, and intermediates (e.g., titanium, aluminum, zirconium, beryllium, magnesium, zinc) that can act as both network formers and modifiers.

Suitable additional materials for use in plastic products include, for example, dispersion aids (e.g., zinc stearate, calcium stearate, ethylene bis-steamide), plasticizers, flame retardants, internal mold release agents, and slip agents.

When coloring a ceramic product, the material typically is added to a ceramic glaze composition. Other materials used in glazes include, for example, silica, metal oxides (e.g., sodium, potassium, calcium), alumina, and opacifiers (e.g., tin oxide, zirconium oxide).

II. Molecular Structure

Some embodiments of materials that satisfy general Formula 1, $AM_{1-x}M'_xM''_yO_{3+y}$, form layers of hexagonal trigonal bipyramids. The particular crystal structure is determined, at least in part, by the value of y. When y is 0, the material forms a crystal structure with a single hexagonal layer of trigonal bipyramids (see, e.g., FIG. 1A). When y is 1, the crystal structure has a double hexagonal layer of trigonal bipyramids (see, e.g., FIG. 1B). Similarly, when y is 2, the crystal structure has a triple hexagonal layer of trigonal bipyramids.

Figure 5:
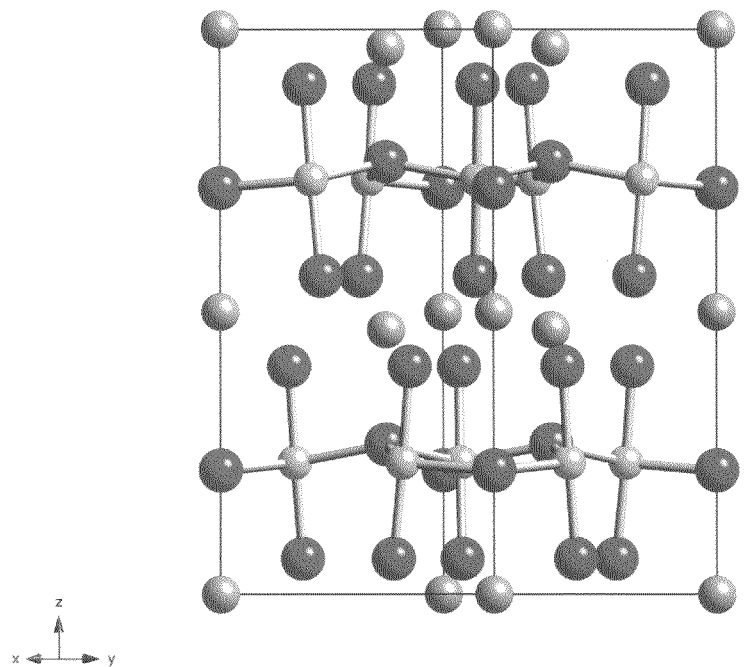

Although materials with the general formula $AM_{1-x}M'_xO_3$ (y=0) form a crystal structure with a single hexagonal layer of trigonal bipyramids, the crystal structure can take one of two slightly different configurations, as shown in FIGS. 2-5. At high temperatures (>600° C.), the materials form a small unit cell (outlined in blue) as shown in FIGS. 2 and 4. However, at lower temperatures, the structure distorts slightly via a ferroelectric transition, forming a larger, polar unit cell (outlined in blue) as shown in FIGS. 3 and 5. In FIGS. 3 and 5, the smaller unit cell is shown outlined in black. The transition between the smaller and larger unit cells is temperature dependent and readily reversible. Edge 'a' is the width of the unit cell. In the small unit cell, a is the distance between two basal, or equatorial, oxygen atoms. Edge 'c' is the height of the unit cell. As shown in FIGS. 4-5, c is the height of three layers of A atoms alternating with two layers of trigonal bipyramids. In the small unit cells, a typically is 3.50-3.70 Å, more typically 3.60-3.65 Å. In the large unit cells, a typically is 5.5-7.0 Å, more typically 6.0-6.5 Å. Both the small and large unit cells have similar values for c, typically 10-13 Å.

Both $YInO_3$ and $YMnO_3$ are known in the common orthorhombic and centric form of the perovskite structure (i.e., a crystalline structure of the formula $A^{2+}B^{4+}X_3^{2+}$, where the 'A' cations are larger than the 'B' cations; X is usually oxygen and is in a face-centered position in the crystal), but they also can be prepared in an acentric hexagonal structure (FIG. 1A) that is not perovskite related. This hexagonal structure comprises layers of $Y^{3+}$ ions separating layers of corner-shared $MO_5$ trigonal bipyramids (M=In, Mn). In this structure, Mn/In is located in trigonal bipyramidal $MnO_5/InO_5$ units with corner sharing of the trigonal basal plane oxygen atoms. However, the Mn/In atoms are not located in the exact centers of the trigonal bipyramids; they are displaced in both the ab basal plane and along the c axis. This structure has been of considerable recent interest because it exhibits an unusual form of improper geometric ferroelectricity accompanied by tilting of the $MO_5$ polyhedra. Such ferroelectricity is compatible with M-site magnetism and therefore allows multiferroic behavior.

Although hexagonal $YInO_3$ and $YMnO_3$ are isostructural, there is a significant difference between the two structures. In the case of $YInO_3$, all In—O distances in the trigonal bipyramidal arrangement are nearly the same at about 2.1 Å. In $YMnO_3$, on the other hand, the apical Mn—O distances are 1.86 Å and the basal plane distances are 2.05 Å. Thus, the apical Mn—O bond lengths in $YMnO_3$ are considerably shorter than those in the basal plane. This leads to crystal field splitting of the 3d orbitals energies in $YMnO_3$ as shown in FIG. 6. Notably, the e'→a' energy splitting, which is the lowest energy excitation for a $d^4$ cation in the cluster limit, depends on the apical M—O bond length through its influence on the energy of the $d_{z^2}$ orbital. While the crystal field stabilization associated with a $d^4$ cation in trigonal bipyramidal coordination has been invoked to explain the stability of hexagonal $YMnO_3$ relative to the competing perovskite structure, trigonal bipyramidal is not a common coordination for $Mn^{3+}$.

In compounds with the general formula, $AMnO_3$, where A is a rare earth metal, substitution with metal cations such as Fe, Co, Ni, Cr, Ti, Ga, or Al is limited before the hexagonal structure converts to the perovskite structure. This behavior is seen even when the end-point compound (i.e., complete replacement of Mn) of the solid solution is stable in the hexagonal phase. However, the inventors surprisingly were able to prepare a complete single-phase $YIn_{1-x}Mn_xO_3$ solid solution despite the fact that the size mismatch between $In^{3+}$ and $Mn^{3+}$ is significant. Without being bound by any particular theory, this complete miscibility is attributed to the similar In—O and Mn—O basal plane distances in hexagonal $YInO_3$ and $YMnO_3$. The large size difference between $In^{3+}$ and $Mn^{3+}$ is manifested only in the apical distances.

Figure 7:
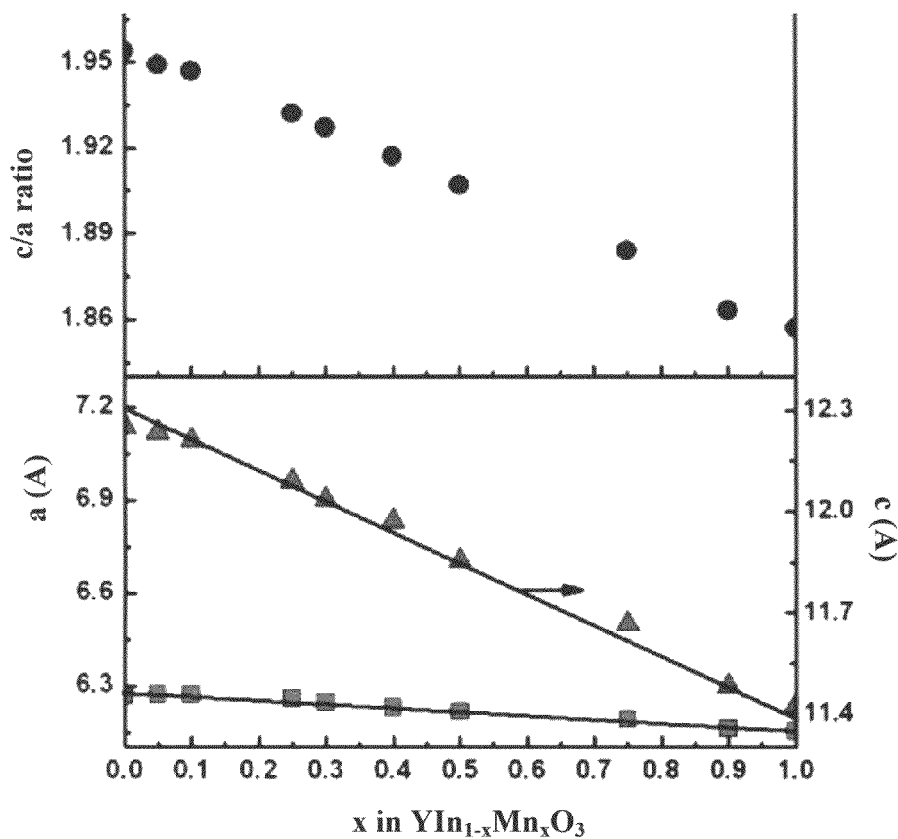
FIG. 7 includes graphs of unit cell dimensions and c/a ratio for the $YIn_{1-x}Mn_xO_3$ solid solution with values of x from 0.0 to 1.0.

A plot of unit cell edges for the $YIn_{1-x}Mn_xO_3$ solid solution is shown in FIG. 7. FIG. 7 also includes a plot of c/a ratio versus x. It is clear that the similar basal-plane bond lengths lead to a weak variation of a across the solid-solution series. However, both c lattice parameter and the c/a ratio decrease dramatically as x increases because of the large difference in apical In—O and Mn—O bond lengths.

Figure 8:
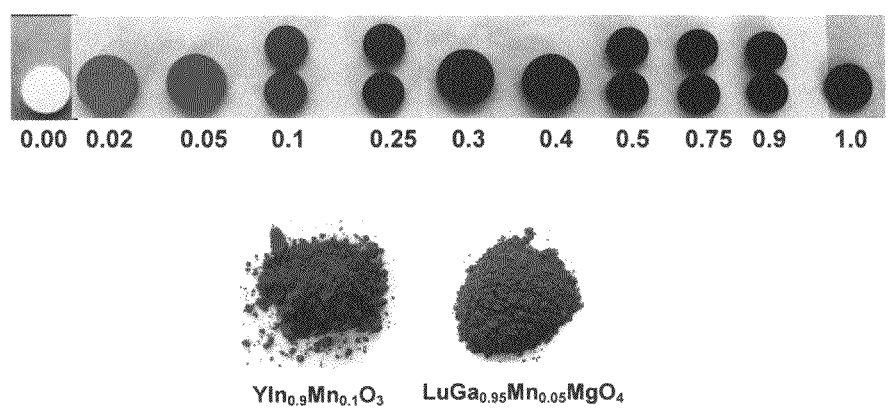
FIG. 8 is a series of color photographs of pellets and powders according to several embodiments of the disclosed compositions. The numbers under the pellets represent the value of x in the structural formulas $YIn_{1-x}Mn_xO_3$ and $LuGa_xMn_{1-x}MgO_4$.
Figure 9:
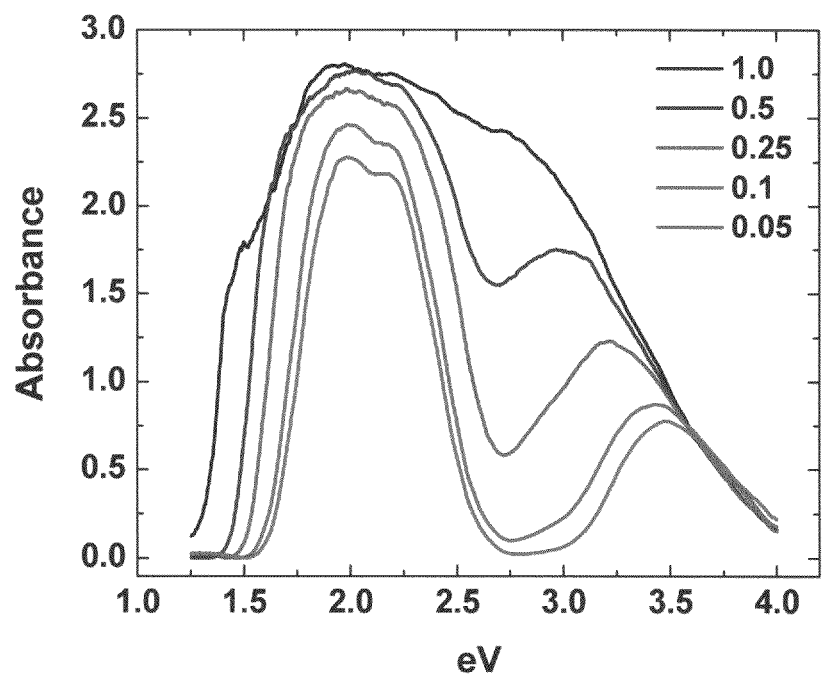
FIG. 9 is a series of diffuse reflectance spectra for the $YIn_{1-x}Mn_xO_3$ solid solution with values of x from 0.05 to 1.0.

The blue color of the powders is evident in FIG. 8 for even very low values of x. To understand the origin of this blue color, diffuse reflectance spectra were measured (FIG. 9), first principles density functional theory (DFT) calculations were performed with the LSDA+U method, which has been shown previously to give reliable results for $YMnO_3$. (Fennie et al., *Phys. Rev. B.*, 72:100103 (2005).) With reference to FIG. 9, at low doping concentrations, there is a strong, narrow (~1 eV width) absorption centered at ~2 eV that absorbs in the red-green region of the visible spectrum. The absorbance then decreases between 2.5 and 3 eV with a second onset near 3 eV. The lack of absorption in the 2.5-3 eV (blue) region of the spectrum results in the blue color. As the concentration of Mn increases, the lower-energy absorption peak broadens and the higher-energy onset shifts to lower energy, consistent with the gradual darkening of the samples toward navy blue. In pure $YMnO_3$, absorption occurs throughout the entire visible region, resulting in the black color.

DFT calculations of the densities of states and optical properties of the fully relaxed end-point compounds and selected intermediates indicate that the peak at 2 eV arises from the transition between the valence-band maximum, consisting of Mn $3d_{x^2-y^2,xy}$ states strongly hybridized with O $2p_{x,y}$ states, and the lowest unoccupied energy level, which in lightly Mn-doped $YInO_3$ is a narrow band formed from the Mn $3d_{z^2}$ state that lies in the band gap of $YInO_3$. (The absence of midgap Mn $3d_{z^2}$ states in pure $YInO_3$ leaves it colorless.) Notably, in the local $D_{3h}$ symmetry of the trigonal bipyramids, the d-d component of this transition (between symmetry labels a' and e' in FIG. 6) is formally symmetry-allowed according to the Laporte selection rule, whereas the e"→a' transition is symmetry-forbidden. This results in a high transition probability and intense absorption. The strong d-d absorption is in striking contrast to the behavior in the approximate $O_h$ crystal field environment of perovskites, where it is formally symmetry-forbidden. In $O_h$ symmetry, hybridization with ligands or structural distortions is required to circumvent the dipole selection rules, and d-d transitions are usually weak. Indeed, no blue color was seen when $Mn^{3+}$ was substituted into $YGaO_3$ or $YAlO_3$ with the perovskite structure, where the $Mn^{3+}$ would be in an environment with approximate $O_h$ symmetry.

The higher-energy peak is assigned to the onset of the transition from the O 2p band to the Mn $3d_{z^2}$ band. With increasing Mn concentrations, the calculations indicate that the Mn 3d levels (particularly the lowest unoccupied state, corresponding to the $3d_{z^2}$ band) broaden substantially, causing the absorption peaks to become broader.

To determine which structural features correlate with the blue color, the structural properties of some intermediate compositions were investigated. DFT calculations on the relaxed structures for both $Y_8Mn_2In_6O_{24}$ and $Y_8Mn_6In_2O_{24}$ units show that while the basal plane Mn—O and In—O distances in these intermediates are similar to each other to those of the end members, the apical Mn—O and In—O distances are very different from each other, maintaining values close to those of the respective end members. Since the energy of the $d_{z^2}$ state relative to the valence-band maximum is determined primarily by the Mn—O apical bond length, this explains the lack of shift in the energy of the 2 eV absorption peak as a function of Mn concentration. If Mn is artificially inserted into the $YInO_3$ structure without allowing the structure to relax to its energy minimum, the $d_{z^2}$ peak shifts to considerably lower energy, and the calculated absorption spectrum changes markedly.

The structure of $YMn_{0.63}In_{0.37}O_3$ was refined from single crystal x-ray diffraction data in space group $P6_3cm$, the same space group used for hexagonal $YMnO_3$ and $YInO_3$. The structure refined normally except for displacement parameters for one of the apical O atoms, suggesting the presence of static disorder arising from the different In—O and Mn—O distances. There are two extreme possibilities for these apical oxygen atoms in the solid solution. One is that the In—O and Mn—O distances of the end members would be maintained in the solid solution. The other is that the O atom in the apical position is not disordered in the solid solution but instead accepts a position intermediate between that expected for the end members. The lack of a significant shift in energy of the 2 eV absorption peak as a function of x in $YIn_{1-x}Mn_xO_3$ phases indicates that the short apical Mn—O distances are maintained in the solid solution. This conclusion is supported by the failure of an ellipsoid to adequately define the electron density at an apical O site. Thus, the $YMn_{0.63}In_{0.37}O_3$ structure was refined with two O atoms at each apical site having occupation values fixed on the basis of the Mn/In ratio. The refinement converged with shorter distances for the sites with the higher occupation. Apical Mn—O distances of 1.86 Å and 1.89 Å and apical In—O distances of 2.05 Å and 2.20 Å were extracted. Because of the complication of overlapping electron density, this refinement of the apical O atoms in the split model can only be considered an approximation. Nonetheless, the success of this split atom refinement is highly compelling evidence that the apical O atoms do not reside at some average position for both Mn and In trigonal bipyramids. Furthermore, these values are in excellent agreement with the first-principles calculations. Violations of Friedel's law in the diffraction data confirm a polar space group. Relative to the paraelectric structure, displacements of atoms along the c axis, which is the polar axis, were found to be of the same magnitude as in $YMnO_3$. Thus, another conclusion from this structure analysis is that the degree of ferroelectric distortion in $YMn_{0.63}In_{0.37}O_3$ is essentially the same as in $YMnO_3$. However, first-principles calculations suggest that the polarization might be substantially suppressed from the values in the end-member compounds due to frustration of the cooperative tilting by the different sizes of the $MO_5$ polyhedra.

$Mn^{3+}$ also was substituted into another structure with trigonal bipyramidal sites, the $YbFe_2O_4$ structure. This structure (FIG. 1B) has layers of rare-earth cations alternating with double layers of $MO_5$ trigonal bipyramids. As in $YMnO_3$, the polyhedral in each $MO_3$ plane share corners through their basal-plane oxygen atoms. Here, however, polyhedral in the second plane share edges between apical and basal oxygens with those in the first plane. As in $YMnO_3$, the topology of the layering should allow the apical bond lengths to adopt different values for the different M-site cations without introducing large strain energies into the lattice. Although $YbFe_2O_4$ is not a suitable host because of its black color related to $Fe^{2+}/Fe^{3+}$ mixed valency, there are several oxides with this structure that are transparent throughout the visible spectrum.[7]

Additional compositions with this structure include compounds with the general formula $AMM''_yO_{3+y}$, where A, M, and M'' are defined as in Formula 2, such as $ScAlMgO_4$, $ScGaMgO_4$, $ScGaZnO_4$, $LuGaMgO_4$, and $InGaMgO_4$. Adding manganese to these compounds produces manganese (III) materials according to Formula 2 with a blue color. For instance, an intense blue color is produced with 5% doping of $Mn^{3+}$ to produce a material with the formula $AM_{0.95}Mn_{0.05}M''_yO_{3+y}$, e.g., $ScAl_{0.95}Mn_{0.5}MgO_4$. Thus, the blue color appears to be a general characteristic of $Mn^{3+}$ in a trigonal bipyramidal site in oxides, provided that structural features such as layering allow for the appropriate apical Mn—O bond length.

III. Methods of Making the Materials

Polycrystalline materials, particularly chromophoric materials, according to Formulas 1-6 are prepared by heating mixtures of reactants, such as metal oxides, in air. For example, powders of $Y_2O_3$, $Mn_2O_3$, and $In_2O_3$ can be mixed thoroughly in desired quantities and heated to produce $YIn_{1-x}Mn_xO_3$.

In certain disclosed embodiments, the material has a color that varies along a color continuum to form a homologous series as the value of x in Formulas 1-6 increases. For example, the material having the formula $YIn_{1-x}Mn_xO_3$ exhibits an intense blue color. A shown in FIG. 8, the blue color darkens and eventually appears black as x increases. Thus, a material having a desired color along the continuum can be prepared by selecting the value of x corresponding to the desired color, and combining the reactants in stoichiometric quantities according to the selected value of x.

In some embodiments, the reactants are dried, e.g., at 800-1000° C., before mixing. The reactants can be mixed by any suitable means, including dissolving the reactants in a suitable solvent or by mechanical mixing (e.g., mortar-and-pestle, ball milling). In certain embodiments, the powders may be mixed, e.g., by mortar and pestle or using an agate ball mill, under a suitable liquid in which they are substantially insoluble, e.g., a lower alkyl (i.e., 1-10 carbon atoms) alcohol such as methanol or ethanol. The liquid is evaporated, and the residual solids are ground into a powder.

In some embodiments, the materials are prepared by dissolving hydrated nitrate salts of the metals in deionized water. An organic acid (e.g., citric acid) is added to the solution, and the solution then is neutralized with an aqueous base (e.g., ammonium hydroxide). The solution is evaporated to form a viscous gel, which subsequently is combusted. In a working embodiment, the gel was combusted at 250° C. for 2 hours.

In some embodiments, the mixed powders are pressed into pellets. For example, the powders may be pressed into pellets using a pressure of 500 psi. The mixed, and optionally pelleted, powders are calcined. In some embodiments, the mixed powders are calcined at temperatures from about 700° C. to about 1500° C. for about 2 hours to about 20 hours. Calcination can be performed in air. Typically, the material undergoes multiple calcinations. The material may be re-ground and re-pelleted between each calcination step. In a working embodiment, pellets comprising $YIn_{1-x}Mn_xO_3$ were calcined for twelve hours in air at 1200° C., and twelve hours in air at 1300° C. with intermediate grinding and re-pelleting; in some instances a third calcination for twelve hours in air at 1300° C. was performed.

Other synthesis techniques such as sol-gel, co-precipitation, hydrothermal including supercritical conditions, spray drying, freeze drying, high-temperature spray pyrolysis (e.g., $TiO_2$ and ZnO) can be used to prepare powders; these techniques may be especially suitable for controlling particle size.

IV. Examples

Examples 1-31

$YIn_{1-x}Mn_xO_3$, $DyIn_{1-x}Mn_xO_3$, $HoIn_{1-x}Mn_xO_3$, $ErIn_{1-x}Mn_xO_3$

The compositions of $YIn_{1-x}Mn_xO_3$ ($0.05 \leq x \leq 0.9$), $DyIn_{1-x}Mn_xO_3$ ($0.1 \leq x \leq 0.8$), $HoIn_{1-x}Mn_xO_3$ ($0.1 \leq x \leq 0.9$), $ErIn_{1-x}Mn_xO_3$ (x=0.1, 0.2, 0.5, 0.8) of Example 1-31 were made using the following procedure. For each Example, appropriate amounts of the starting oxides, $Y_2O_3$, $Dy_2O_3$, $Ho_2O_3$, $Er_2O_3$, $In_2O_3$ and $Mn_2O_3$ were weighed according to the stoichiometric ratios and mixed thoroughly in an agate mortar. The gram amounts for 0.5-6 g sample sizes of the starting materials used are shown in Table 2. In each Example, the mixed powder was pressed into pellets and was fired in air at 1200° C. for 12 hours. The calcined pellet was reground, pressed into pellets and fired again at 1300° C. for 12 hours. In some cases it was necessary to repeat grinding and firing in air at 1300° C. for 12 hours. The ramping rate of each heating cycle was 300° C./hr. Cell parameters a and c were determined by X-ray diffraction as described in Example 104.

Examples 32-47

$YCu_{0.5}Ti_{0.5}O_3$, $Y(Cu_{0.5}Ti_{0.5})_{1-x}Mn_xO_3$, $YCu_{0.45}Ti_{0.45}M_{0.1}O_3$ (M=Al, Ga), $Y(Cu_{0.5}Ti_{0.5})_{1-x}Fe_xO_3$ (x=0.1, 0.2), $LnCu_{0.25}Ti_{0.25}Mn_{0.5}O_3$ (Ln=Yb, Lu)

The compositions of $YCu_{0.5}Ti_{0.5}O_3$, $Y(Cu_{0.5}Ti_{0.5})_{1-x}Mn_xO_3$ ($0.1 \leq x \leq 0.9$), $YCu_{0.45}Ti_{0.45}M_{0.1}O_3$ (M=Al, Ga), $Y(Cu_{0.5}Ti_{0.5})_{1-x}Fe_xO_3$ (x=0.1, 0.2), $LnCu_{0.25}Ti_{0.25}Mn_{0.5}O_3$ (Ln=Yb, Lu) of Examples 32-47 were made using the following procedure. For each Example, appropriate amounts of the starting oxides, $Y_2O_3$, $Lu_2O_3$, $Yb_2O_3$, CuO, $TiO_2$, $Mn_2O_3$, $Fe_2O_3$, $Ga_2O_3$, and $Al_2O_3$ were weighed according to the stoichiometric ratios and mixed thoroughly in an agate mortar for approximately 15 minutes under ethanol. The gram amounts for 1.5-2.5 g sample sizes of the starting materials used are shown in Tables 3 and 4. In each Example, the mixed powder was pressed into pellets and was fired in air at 900° C. for 10 hours (Examples 32-34, 46, 47) or 12 hours (Examples 35-45). The calcined pellets were reground, pressed into pellets and fired at 1050° C. for 12 hours (Examples 46, 47) or 18 hours (32-45). The calcined pellets were reground, pressed into pellets and fired a third time at 1050° C. for 12 hours (Examples 32, 33, 35-41) or 18 hours (42-45). The calcined pellets were reground, pressed into pellets and fired a fourth time at 1050° C. for 12 hours for Examples 32, 33, 35-41 and at 1100° C. for Examples 42-45. The ramping rate of each heating cycle was 300° C./hr. Cell parameters a and c were determined by X-ray diffraction as described in Example 104.

Examples 48-62

$YGa_{0.1}In_{0.9-x}Mn_xO_3$, $YFe_xIn_{0.9-x}Mn_{0.1}O_3$, $YFe_xIn_{0.8-x}Mn_{0.2}O_3$, $YFe_xIn_{0.7-x}Mn_{0.3}O_3$, $YFe_xIn_{0.6-x}Mn_{0.4}O_3$

The compositions of $YGa_{0.1}In_{0.9-x}Mn_xO_3$, $YFe_xIn_{0.9-x}Mn_{0.1}O_3$, $YFe_xIn_{0.8-x}Mn_{0.2}O_3$, $YFe_xIn_{0.7-x}Mn_{0.3}O_3$, $YFe_xIn_{0.6-x}Mn_{0.4}O_3$ ($0.1 \leq x \leq 0.3$) of Examples 48-62 were made using the following procedure. For each Example, appropriate amounts of the starting oxides, $Y_2O_3$, $Ga_2O_3$, $In_2O_3$, $Mn_2O_3$, and $Fe_2O_3$ were weighed according to the stoichiometric ratios and mixed thoroughly in an agate mortar. The gram amounts for 1 g sample sizes of the starting materials used are shown in Table 5. In each Example, the mixed powder was pressed into pellets and was fired in air at 1200° C. for 12 hours. The calcined pellet was reground, pressed into pellets and fired again at 1300° C. for 12 hours. The calcined pellet was reground, pressed into pellets and fired again at 1300° C. for 12 hours. The ramping rate of each heating cycle was 300° C./hr. Cell parameters a and c were determined by X-ray diffraction as described in Example 104.

Examples 63-67

$YSc_{1-x}Mn_xO_3$, $YIn_{1-x}Fe_xO_3$

The compositions of $YSc_{1-x}Mn_xO_3$ ($0.8 \leq x \leq 0.9$) and $YIn_{1-x}Fe_xO_3$, ($0.1 \leq x \leq 0.3$) of Examples 63-67 were made using the following procedure. For each Example, appropriate amounts of the starting oxides, $Y_2O_3$, $Mn_2O_3$, $Sc_2O_3$, $In_2O_3$, and $Fe_2O_3$ were weighed according to the stoichiometric ratios and mixed thoroughly in an agate mortar. The gram amounts for 0.5-1 g sample sizes of the starting materials used are shown in Table 5. In each Example, the mixed powder was pressed into pellets and was fired in air at 1200° C. for 12 hours. The calcined pellet was reground, pressed into pellets and fired again at 1300° C. for 12 hours. The ramping rate of each heating cycle was 300° C./hr. Cell parameters a and c were determined by X-ray diffraction as described in Example 104.

Examples 68-69

$Y_{1-x}Eu_xMn_{0.25}In_{0.75}O_3$

The compositions of $Y_{1-x}Eu_xMn_{0.25}In_{0.75}O_3$ (x=0.05 and 0.1) of Examples 68-69 were made using the following procedure. For each Example, appropriate amounts of the starting oxides, $Y_2O_3$, $Mn_2O_3$, $Sc_2O_3$, $In_2O_3$, and $Fe_2O_3$ were weighed according to the stoichiometric ratios and mixed thoroughly in an agate mortar. The gram amounts for 0.5-1 g sample sizes of the starting materials used are shown in Table 5. In each Example, the mixed powder was pressed into pellets and was fired in air at 1300° C. for 12 hours. The calcined pellet was reground, pressed into pellets and fired again at 1300° C. for 12 hours. The ramping rate of each heating cycle was 300° C./hr. Cell parameters a and c were determined by X-ray diffraction as described in Example 104.

Examples 70-76

$YAl_{1-x}Mn_xO_{3-z}(CO_3)_z$

The compositions of $YAl_{1-x}Mn_xO_{3-z}(CO_3)_z$ ($0.2 \leq x \leq 0.8$; $0.0 \leq z \leq 1.0$) of Examples 70-76 were made using the following procedure. For each Example, appropriate amounts of the starting hydrated nitrates, $Y(NO_3)_3 \cdot 6H_2O$, $Al(NO_3)_3 \cdot 9H_2O$, $Mn(NO_3)_2 \cdot 4H_2O$ were weighed according to the stoichiometric ratios and dissolved in a small amount of deionized water. The gram amounts for 1.5 or 4 g sample sizes of the starting materials used are shown in Table 6. In each Example, the solution was heated to 60° C. with stirring for about 15 minutes. Citric acid ($C_6H_8O_7$) was then added to the solution and allowed to dissolve under stirring. The solution was neutralized with aqueous $NH_4OH$. The solution was evaporated at 90° C. for several hours until a viscous gel is formed. The dried gel was combusted at 250° C. for 2 hours. The resulting black product was ground, and the powder was heated at 750° C. for 10 hours in air. The powder was then pressed into pellets, and the pellets were heated to 900° C. for 12 hours in air, reground, pressed into pellets, and heated at 900° C. for 12 hours in air. The ramping rate of each heating cycle was 300° C./hr. Cell parameters a and c were determined by X-ray diffraction as described in Example 104.

Examples 77-80

$YFe_{1-x}In_xO_3$

The compositions of $YFe_{1-x}In_xO_3$ ($0.1 \leq x \leq 0.3$) of Examples 77-80 were made using the following procedure. For each Example, appropriate amounts of the starting hydrated nitrates, $Y(NO_3)_3 \cdot 6H_2O$, $Fe(NO_3)_3 \cdot 9H_2O$, $In(NO_3)_3 \cdot H_2O$ were weighed according to the stoichiometric ratios and dissolved in a small amount of deionized water. The gram amounts for 1.5 g sample sizes of the starting materials used are shown in Table 6. In each Example, the solution was heated to 60° C. with stirring for about 15 minutes. Citric acid ($C_6H_8O_7$) was then added to the solution and allowed to dissolve under stirring. The solution was neutralized with aqueous $NH_4OH$. The solution was then evaporated at 90° C. for several hours until a viscous gel is formed. The dried gel was combusted at 250° C. for 2 hours. The resulting black product was then ground, and the powder was heated at 700° C. for 18 hours in air. For x=0.3, an additional heating at 700° C. for 20 hours in air as powder was required. The ramping rate of each heating cycle was 300° C./hr. Cell parameters a and c were determined by X-ray diffraction as described in Example 104.

Examples 81-103

$LuGa_{1-x}Mn_xMgO_4$, $LuGa_{1-x}Mn_xZnO_4$, $ScAl_{1-x}Mn_xMgO_4$, $ScAl_{1-x}Mn_xZnO_4$, $InGa_{1-x}Mn_xZnO_4$, $InGa_{1-x}Mn_xMgO_4$, $ScGa_{1-x}Mn_xZnO_4$, $ScGa_{1-x}Mn_xMgO_4$, $LuGa_{1-x}Mn_xZnO_4$, $In(In_{0.2}Ga_{0.8})_{1-x}Mn_xMgO_4$, $LuGa_{1-x}Mn_xZn_2O_5$

The hexagonal double-layer and triple-layer compositions of Examples 81-103 were made using the following procedure. For each Example, appropriate amounts of the starting oxides were weighed according to the desired stoichiometric ratios. The gram amounts of the starting materials used are shown in Table 7. In general, the powders were ball-milled for 2 hours and then calcined at 1,000° C. for 5 hours. Following calcination, the powders were ball-milled for 2 hours, pressed into pellets and then calcined again under the conditions shown in Table 7. The ramping rate of each heating cycle was 300° C./hr.

Example 104

Synthesis and Characterization of $YIn_{1-x}Mn_xO_3$ Materials

Synthesis

Polycrystalline samples were prepared by heating mixtures of reactants in air. Reactants were $Y_2O_3$ (Nucor: Research Chemicals, 99.99%), $Mn_2O_3$ (JMC, 98%+), and $In_2O_3$ (Aldrich, 99.99%). Powders of $Y_2O_3$ were dried at 850° C. before weighing. Appropriate quantities of reactants were mixed thoroughly under ethanol in an agate mortar. Intimately mixed powders were pressed into pellets under a pressure of approximately 500 psi. The pellets were calcined for twelve hours once in air at 1200° C., and twice in air at 1300° C. with intermediate grinding. Ramp rates were 300° C./hr.

Single crystals were grown in a $PbF_2$ flux using a 10-fold excess by weight of flux. The mixture was placed in a platinum crucible, which was placed in an alumina crucible and capped. The mixture was rapidly heated in air to 840° C. (melting point of $PbF_2$) and held for 3 hours. The sample was then heated slowly (5° C./hr) to 950° C. (the temperature at which $PbF_2$ evaporates), and held for 6 hours before cooling to room temperature at 300° C./hr. The flux was dissolved in nitric acid. The product consisted of thin black hexagonal plates.

Single Crystal and Powder Diffraction

Figure 10:
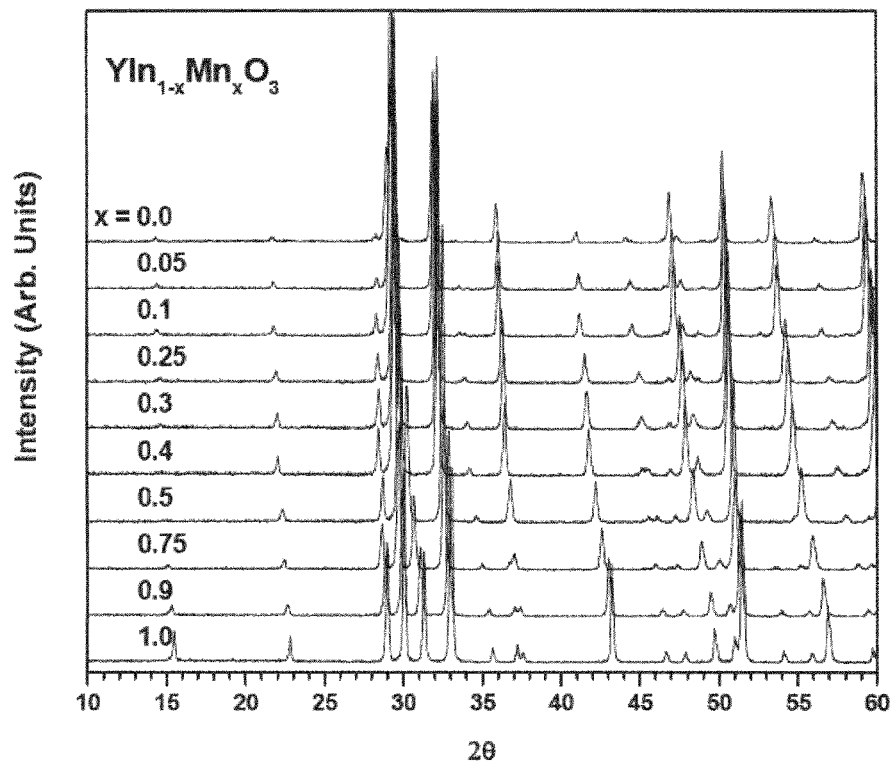
FIG. 10 is a series of powder diffraction patterns from 10-60° 2θ for the $YIn_{1-x}Mn_xO_3$ solid solution with values of x from 0.0 to 1.0 with $YMnO_3$ at the bottom and $YInO_3$ at the top.

X-ray powder diffraction (XRD) patterns were obtained with a Rigaku MiniFlex II diffractometer using Cu Kα radiation and graphite monochromator. Single crystal X-ray diffraction data were collected on a Bruker SMART APEXII CCD system at 173 K. A standard focus tube was used with an anode power of 50 kV at 30 mA, a crystal-to-plate distance of 5.0 cm, 512×512 pixels/frame, beam center (256.52, 253.16), total frames of 6602, oscillation/frame of 0.501, exposure/frame of 10.0 s/frame and SAINT integration. A subsequent SADABS correction was applied. The crystal structure was solved with the direct method program SHELXS and refined with full-matrix least-squares program SHELXTL. (G. M. Sheldrick, SHELEXTL, Version 6.14, Bruker Analytical X-ray Instruments, Inc., Madison, Wis., 2003.) Crystallographic results for $YIn_{0.37}Mn_{0.63}O_3$ are summarized in Tables 8-11. The crystal was found to be twinned with an up/down polarization ratio of 0.35(3). X-ray powder diffraction (XRD) patterns were obtained with a Rigaku MiniFlex II diffractometer using Cu Kα radiation and graphite monochromator. Powder diffraction patterns from 10-60° 2θ for the $YIn_{1-x}Mn_xO_3$ solid solution with values of x from 0.0 to 1.0 can be seen in FIG. 10. The bottom pattern is $YMnO_3$, and the top pattern is $YInO_3$.

TABLE 8

Crystal data and structure refinement $YIn_{0.37}Mn_{0.63}O_3$

| | |
|---|---|
| Formula weight | 214.00 |
| Temperature | 173(2) K |
| Wavelength | 0.71073 Å |

TABLE 8-continued

Crystal data and structure refinement $YIn_{0.37}Mn_{0.63}O_3$

| | |
|---|---|
| Crystal system | Hexagonal |
| Space group | P6₃cm |
| Unit cell dimensions | a = 6.1709(6) Å |
| | c = 11.770(2) Å |
| Volume | 388.17(9) Å³ |
| Z | 6 |
| Density (calculated) | 5.437 mg/m³ |
| Absorption coefficient | 28.267 mm⁻¹ |
| F(000) | 576 |
| Crystal size | 0.05 × 0.03 × 0.01 mm |
| Theta range for data collection | 3.46 to 28.31° |
| Index ranges | −7 ≤ h ≤ 8, −7 ≤ k ≤ 7, −15 ≤ l ≤ 15 |
| Reflections collected | 3766 |
| Independent reflections | 363 [R(int) = 0.0263] |
| Completeness to theta = 28.31° | 98.0% |
| Absorption correction | Semi-empirical from equivalents |
| Max. and min. transmission | 0.7653 and 0.3322 |
| Refinement method | Full-matrix least-squares on F2 |
| Data/restraints/parameters | 363/0/31 |
| Goodness-of-fit on F2 | 1.178 |
| Final R indices [I > 2sigma(I)] | R1 = 0.0219, wR2 = 0.0407 |
| R indices (all data) | R1 = 0.0288, wR2 = 0.0438 |
| Largest diff. peak and hole | 0.934 and −0.629 e/Å³ |

TABLE 9

Atomic coordinates and equivalent isotropic displacement parameters (Å² × 10³).

| | x | y | z | U(eq) |
|---|---|---|---|---|
| Y1 | 0 | 0 | 0 | 3(1) |
| Y2 | 1/3 | 2/3 | 0.9636(1) | 13(1) |
| Mn/In[a] | 0.3342(4) | 0 | 0.7211(4) | 6(1) |
| O1 | 0.322(4) | 0 | 0.879(3) | 21(6) |
| O1' | 0.289(5) | 0 | 0.893(2) | 0(6) |
| O2 | 0.635(3) | 0 | 0.061(2) | 0(3) |
| O2' | 0.655(5) | 0 | 0.034(2) | 7(6) |
| O3 | 0 | 0 | 0.202(2) | 24(4) |
| O4 | 1/3 | 2/3 | 0.749(1) | 13(3) |

U(eq) is defined as one third of the trace of the orthogonalized $U^{ij}$ tensor.
[a] Refining occupation parameters gave an Mn/In ratio of 1.70 for this site. The O1/O1' and O2/O2' occupancy ratios are fixed at the Mn/In ratio.

TABLE 10

Bond lengths (Å)

| | | |
|---|---|---|
| Y1—O1 | X 3 | 2.44(3) |
| Y1—O1' | X 3 | 2.18(3) |
| Y1—O2 | X 3 | 2.36(2) |
| Y1—O2' | X 3 | 2.17(3) |
| Y1—O3 | | 2.38(2)/3.51(2) |
| Y2—O1 | X 3 | 2.32(2) |
| Y2—O1' | X 3 | 2.36(2) |
| Y2—O2 | X 3 | 2.28(1) |
| Y2—O2' | X 3 | 2.18(1) |
| Y2—O4 | X 3 | 2.53(1)/3.35(1) |
| Mn/In—O1 | | 1.86(3) |
| Mn/In—O1' | | 2.05(3) |
| Mn/In—O2 | | 1.89(2) |
| Mn/In—O2' | | 2.20(3) |
| Mn/In—O3 | | 2.074(3) |
| Mn/In—O4 | X 2 | 2.080(3) |

TABLE 11

Anisotropic displacement parameters (Å² × 10³).[a]

| | U¹¹ | U²² | U³³ | U²³ | U¹³ | U¹² |
|---|---|---|---|---|---|---|
| Y1 | 2(1) | 2(1) | 6(1) | 0 | 0 | 1(1) |
| Y2 | 6(1) | 6(1) | 28(1) | 0 | 0 | 3(1) |
| Mn/In | 7(1) | 5(1) | 5(1) | 0 | −1(1) | 2(1) |
| O3 | 33(7) | 33(7) | 5(7) | 0 | 0 | 17(3) |
| O4 | 3(3) | 3(3) | 33(7) | 0 | 0 | 1(1) |

The anisotropic displacement factor exponent takes the form: $-2\pi^2[h^2 a^{*2}U^{11} + \ldots + 2hk a^* b^* U^{12}]$
[a] Split atoms O1, O1', O2, and O2' were refined with isotropic displacement parameters.

First-Principles Calculations

First-principles calculations were performed with plane-wave density functional theory using the Vienna Ab-initio Simulation Package (VASP). (Kresse, G., and Furthmueller, J., *Phys. Rev. B* 54, 11169-11186 (1996); Kresse, G., and Joubert, D., *Phys. Rev. B* 59, 1758-1775 (1999).) Exchange and correlation effects are treated on the level of LSDA+U, with an on-site Coulomb repulsion U=5.0 eV and an intra-atomic exchange splitting of J=0.5 eV for Mn d states. (Liechtenstein, A. I., Anisimov, V. I., and Zaanen, J., *Phys. Rev. B* 52, R5467-R5470 (1995).) A global antiferromagnetic ordering with ferromagnetic Mn planes was adopted for the simulations. Intermediates within periodic boundary conditions were studied using the supercell approach with lattice constants taken from experimental values presented in FIG. 7. The 40-atom supercells permit concentrations of x=0.0, 0.25, 0.5, 0.75 and 1.0 while maintaining equal numbers of In and Mn atoms in each layer. An ordering was chosen in which the minority component was maximally separated in space; thus, the possibility of In or Mn clustering was ignored.

All structures were initialized in the centrosymmetric P6₃/mmc space group and all atomic degrees of freedom were optimized until forces were less than 0.1 meV/Å. This strict tolerance allowed accurate study of delicate features of the atomic structure, such as tiltings of the polyhedra that are responsible for ferroelectricity. (Fennie, C. J., and Rabe, K. M., *Phys. Rev. B* 72, 100103(4) (2005).)

Summary of Convergence Parameters:

1) 450 eV plane wave cutoff (33.1 Ry, 16.5 Ha)

2) 3×3×2 Monkhorst-Pack k-point mesh containing $k_x=k_y=0$

3) Electronic total energy converged to 1×10⁻⁹ eV

4) Average ionic force relaxed to ≦0.5 meV/Å

Results are summarized in Tables 12 and 13.

TABLE 12

Distances and polyhedral volumes obtained after relaxation. Multiple entries indicate structural disorder within the simulation cell.

| Compound | In—O$_{ap}$ (Å) | In—O$_{eq}$ (Å) | Mn—O$_{ap}$ (Å) | Mn—O$_{eq}$ (Å) |
|---|---|---|---|---|
| Y₆In₆O₁₈ | 2.11, 2.13 | 2.13, 2.14 | N/A | N/A |
| Y₈In₈O₂₄ | 2.09, 2.12 | 2.13, 2.13 | N/A | N/A |
| Y₈Mn₂In₆O₂₄ | 2.10, 2.12 | 2.14 | 1.91, 1.93 | 2.00, 2.04 |
| Y₈Mn₆In₂O₂₄ | 2.08 | 2.16, 2.18 | 1.88, 1.91 | 2.01, 2.08 |
| Y₈Mn₈O₂₄ | N/A | N/A | 1.85, 1.88 | 2.03, 2.11 |
| Y₆Mn₆O₁₈ | N/A | N/A | 1.87 | 2.04, 2.11 |

TABLE 13

First-principles calculations of the importance of short apical Mn—O bonds.

| Structure | a (Å) | c (Å) | Mn—$O_{ap}$(Å) | Mn—$O_{eq}$(Å) | $E(d_z2) - E_{VBM}$(eV) |
|---|---|---|---|---|---|
| Relaxed | 6.26 | 12.1 | 1.91, 1.93 | 2.04 | 2.2 |
| $YInO_3$ | 6.28 | 12.2 | 2.09, 2.12 | 2.13 | 0.9 |
| $YMnO_3$ | 6.12 | 11.4 | 1.85, 1.88 | 2.03 | 2.1 |

We choose three structures for x = 0.25 composition: fully relaxed, and doping within the constrained $YMnO_3$ and $YInO_3$ ground-state structures.

Evaluation of $YIn_{1-x}Mn_xO_3$ Pigmentary Properties

Three samples of $YIn_{1-x}Mn_xO_3$ were prepared as described above with x values of 0.05, 0.20, and 0.35. Thus, sample A had composition $YIn_{0.95}Mn_{0.05}O_3$, sample B had composition $YIn_{0.80}Mn_{0.20}O_3$, and sample C had composition $YIn_{0.65}Mn_{0.35}O_3$. Each sample had a mass of 8-10 grams.

Each sample was crushed using a mortar and pestle, and ground into a powder. Laser-scattering particle size analysis showed that the average particle size for the samples ranged from 13-28 μm. To further reduce the particle size, the materials were milled by shaking in water in a small plastic jar with zircon beads. Table 14 shows the particle size of each sample after milling. BL385 is a control pigment, Shepherd Blue 385 (Shepherd Color Company, Cincinnati, Ohio).

TABLE 14

| | Particle Size (μm) | | |
|---|---|---|---|
| Sample | 10% | 50% | 90% |
| BL385 | 0.5 | 0.8 | 1.4 |
| A | 0.6 | 1.1 | 2.0 |
| B | 0.7 | 1.2 | 2.2 |
| C | 0.7 | 1.2 | 2.2 |

Figure 11:
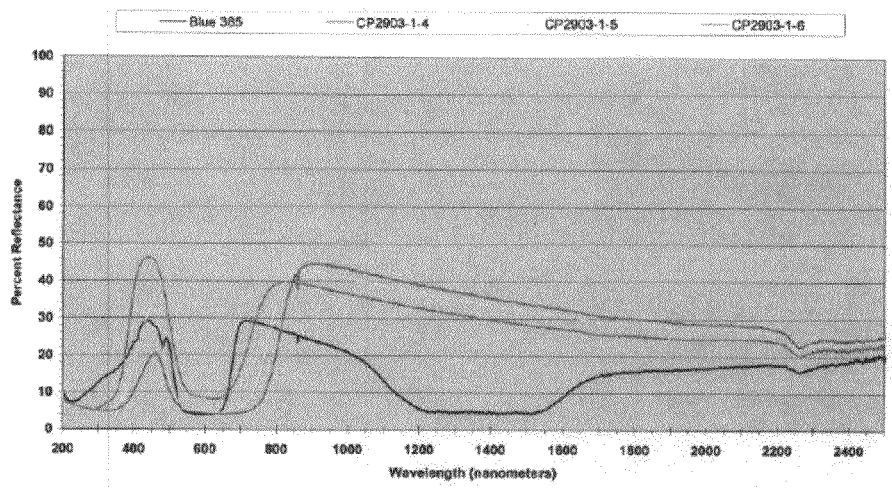
FIG. 11 is a series of full reflectance curves of materials with the formula $YIn_{1-x}Mn_xO_3$.

The materials were evaluated for color in a polyvinylidenedifluoride (PVDF)/acrylic coating. Masstone and 4:1 tint (4 parts titanium dioxide/1 part blue pigment) coatings were prepared and coated onto aluminum panels. color, gloss, opacity, and total solar reflectance (TSR) results are shown in Tables 15 and 16. Full reflectance curves (UV/VIS/NIR) are shown in FIG. 11.

TABLE 15

| | Masstone Color | | | | | |
|---|---|---|---|---|---|---|
| Pigment | L* | a* | b* | Opacity (contrast ratio) | TSR (B/W) | 60 Gloss |
| BL385 | 35.0 | 5.3 | −42.0 | 82 | 13/30 | 33 |
| A | 45.9 | 5.4 | −45.6 | 89 | 24/42 | 48 |
| B | 34.1 | 11.7 | −44.4 | 98 | 21/34 | 45 |
| C | 30.4 | 5.6 | −31.5 | 99 | 20/31 | 46 |

TABLE 16

| | Tint (4:1) | | | | | |
|---|---|---|---|---|---|---|
| Pigment | L* | a* | b* | % STR-SUM | % STR-SWL | 60 Gloss |
| BL385 | 77.2 | −8.0 | −22.8 | control | control | 51 |
| A | 83.8 | −3.5 | −14.1 | 53 | 32 | 53 |
| B | 77.9 | −2.9 | −19.3 | 110 | 62 | 51 |
| C | 75.4 | −3.5 | −17.6 | 145 | 76 | 53 |

Figure 12:
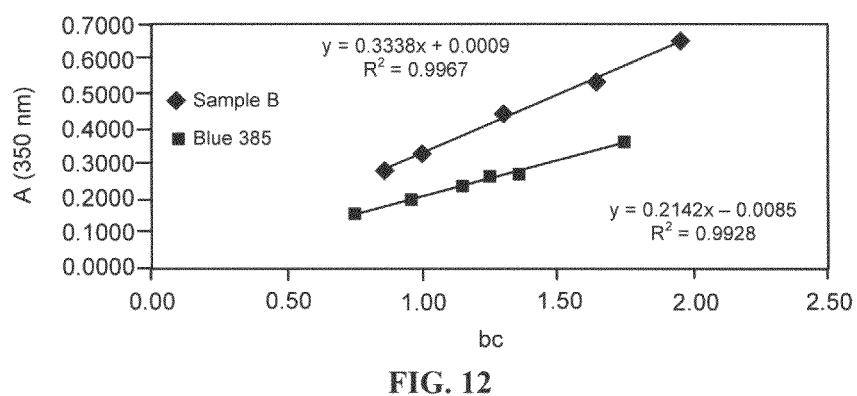
FIG. 12 is a graph of absorbance versus bc (thickness× concentration) for materials with the formula $YIn_{1-x}Mn_xO_3$.

UV opacity of sample B and BL385 were measured by preparing PVDF films of various thicknesses at 5% pigment loading, and measuring the transmission through the films over the UV wavelength range. The results are shown in Table 17 and FIG. 12, where b is the thickness of the sample in microns, and c is the concentration (g/g) of the pigment in the sample.

TABLE 17

| Pigment | b (μm) | c (g/g) | b · c | A (350 nm) |
|---|---|---|---|---|
| Blue 385 | 19 | 0.05 | 0.95 | 0.2024 |
| Blue 385 | 15 | 0.05 | 0.75 | 0.1507 |
| Blue 385 | 25 | 0.05 | 1.25 | 0.2592 |
| Blue 385 | 27 | 0.05 | 1.35 | 0.2700 |
| Blue 385 | 23 | 0.05 | 1.15 | 0.2377 |
| Blue 385 | 35 | 0.05 | 1.75 | 0.3715 |
| Sample B | 17 | 0.05 | 0.85 | 0.2832 |
| Sample B | 20 | 0.05 | 1.00 | 0.3318 |
| Sample B | 26 | 0.05 | 1.30 | 0.4467 |
| Sample B | 39 | 0.05 | 1.95 | 0.6558 |
| Sample B | 33 | 0.05 | 1.65 | 0.5400 |

At this time, PVDF/acrylic panels including the sample pigments are undergoing an accelerated weathering study in a QUV accelerated weathering tester (Q-Lab Corporation, Cleveland, Ohio).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

TABLE 2

| | | | Precursor masses (g) | | | | | |
|---|---|---|---|---|---|---|---|---|
| Ex. | Composition | Color | $Y_2O_3$ | $Dy_2O_3$ | $Ho_2O_3$ | $Er_2O_3$ | $In_2O_3$ | $Mn_2O_3$ |
| 1 | $YIn_{0.95}Mn_{0.05}O_3$ | Sky Blue | 0.5409 | — | — | — | 0.6363 | 0.0191 |
| 2 | $YIn_{0.9}Mn_{0.1}O_3$ | Bright Blue | 0.5513 | — | — | — | 0.6101 | 0.0386 |
| 3 | $YIn_{0.85}Mn_{0.15}O_3$ | Bright Blue | 2.7907 | — | — | — | 2.9166 | 0.2927 |
| 4 | $YIn_{0.8}Mn_{0.2}O_3$ | Bright Blue | 2.8256 | — | — | — | 2.7793 | 0.3951 |
| 5 | $YIn_{0.75}Mn_{0.25}O_3$ | Royal Blue | 0.5724 | — | — | — | 0.5278 | 0.1001 |
| 6 | $YIn_{0.7}Mn_{0.3}O_3$ | Royal Blue | 0.5796 | — | — | — | 0.4989 | 0.1216 |
| 7 | $YIn_{0.65}Mn_{0.35}O_3$ | Navy Blue | 2.9356 | — | — | — | 2.3461 | 0.7183 |
| 8 | $YIn_{0.6}Mn_{0.4}O_3$ | Navy Blue | 0.5949 | — | — | — | 0.4388 | 0.1663 |

TABLE 2-continued

| | | | | | | | |
|---|---|---|---|---|---|---|---|
| 9 $YIn_{0.55}Mn_{0.45}O_3$ | Navy Blue | 3.0138 | — | — | — | 2.0380 | 0.9482 |
| 10 $YIn_{0.5}Mn_{0.5}O_3$ | Dark Navy Blue | 0.6110 | — | — | — | 0.3755 | 0.2135 |
| 11 $YIn_{0.25}Mn_{0.75}O_3$ | Black | 0.6552 | — | — | — | 02014 | 0.3435 |
| 12 $YIn_{0.1}Mn_{0.9}O_3$ | Black | 0.6363 | — | — | — | 0.0843 | 0.4309 |
| 13 $DyIn_{0.9}Mn_{0.1}O_3$ | Bright Blue | — | 0.7008 | — | — | 0.4695 | 0.0297 |
| 14 $DyIn_{0.8}Mn_{0.2}O_3$ | Royal Blue | — | 0.7142 | — | — | 0.4253 | 0.0605 |
| 15 $DyIn_{0.7}Mn_{0.3}O_3$ | Dark Royal Blue | — | 0.7281 | — | — | 0.3794 | 0.0925 |
| 16 $DyIn_{0.6}Mn_{0.4}O_3$ | Dark Navy Blue | — | 0.4951 | — | — | 0.2211 | 0.0838 |
| 17 $DyIn_{0.5}Mn_{0.5}O_3$ | Dark Navy/Black | — | 0.5051 | — | — | 0.1880 | 0.1069 |
| 18 $DyIn_{0.4}Mn_{0.6}O_3$ | Black | — | 0.5156 | — | — | 0.1535 | 0.1309 |
| 19 $DyIn_{0.3}Mn_{0.7}O_3$ | Black | — | 0.5265 | — | — | 0.1176 | 0.1560 |
| 20 $DyIn_{0.2}Mn_{0.8}O_3$ | Black | — | 0.5378 | — | — | 0.0801 | 0.1821 |
| 21 $HoIn_{0.9}Mn_{0.1}O_3$ | Bright Blue | — | — | 0.2920 | — | 0.1956 | 0.0124 |
| 22 $HoIn_{0.8}Mn_{0.2}O_3$ | Royal Blue | — | — | 0.5983 | — | 0.3517 | 0.0499 |
| 23 $HoIn_{0.7}Mn_{0.3}O_3$ | Dark Royal Blue | — | — | 0.7319 | — | 0.3764 | 0.0917 |
| 24 $HoIn_{0.5}Mn_{0.5}O_3$ | Dark Navy/Black | — | — | 0.6344 | — | 0.2331 | 0.1325 |
| 25 $HoIn_{0.3}Mn_{0.7}O_3$ | Black | — | — | 0.7932 | — | 0.1749 | 0.2320 |
| 26 $HoIn_{0.2}Mn_{0.8}O_3$ | Black | — | — | 0.6751 | — | 0.0992 | 0.2257 |
| 27 $HoIn_{0.1}Mn_{0.9}O_3$ | Black | — | — | 0.8279 | — | 0.0608 | 0.3113 |
| 28 $ErIn_{0.9}Mn_{0.1}O_3$ | Flat Royal Blue | — | — | — | 0.2951 | 0.1928 | 0.0121 |
| 29 $ErIn_{0.8}Mn_{0.2}O_3$ | Royal Blue | — | — | — | 0.6013 | 0.3491 | 0.0496 |
| 30 $ErIn_{0.5}Mn_{0.5}O_3$ | Dark Navy Blue | — | — | — | 0.6372 | 0.2313 | 0.1315 |
| 31 $ErIn_{0.2}Mn_{0.8}O_3$ | Black | — | — | — | 0.6778 | 0.0984 | 0.2238 |

| | Cell Parameters | | Mass Tot. | 1st Heat | 2nd Heat | 3rd Heat |
|---|---|---|---|---|---|---|
| Ex. | a (Å) | c (Å) | (g) | °C./Hr | °C./Hr | °C./Hr |
| 1 | 6.2731 | 12.234 | 1.2 | 1200/12 | 1300/12 | 1300/12 |
| 2 | 6.2718 | 12.2115 | 1.2 | 1200/12 | 1300/12 | 1300/12 |
| 3 | 6.2535 | 12.1157 | 6 | 1200/12 | 1300/12 | 1300/12 |
| 4 | 6.2542 | 12.0967 | 6 | 1200/12 | 1300/12 | 1300/12 |
| 5 | 6.2592 | 12.0915 | 1.2 | 1200/12 | 1300/12 | 1300/12 |
| 6 | 6.2470 | 12.0371 | 1.2 | 1200/12 | 1300/12 | 1300/12 |
| 7 | 6.2284 | 11.9405 | 6 | 1200/12 | 1300/12 | 1300/12 |
| 8 | 6.2300 | 11.9739 | 1.2 | 1200/12 | 1300/12 | 1300/12 |
| 9 | 6.2183 | 11.8605 | 6 | 1200/12 | 1300/12 | 1300/12 |
| 10 | 6.2164 | 11.8548 | 1.2 | 1200/12 | 1300/12 | 1300/12 |
| 11 | 6.1923 | 11.6685 | 1.2 | 1200/12 | 1300/12 | 1300/12 |
| 12 | 6.1623 | 11.4822 | 1.2 | 1200/12 | 1300/12 | 1300/12 |
| 13 | 6.2842 | 12.1868 | 1.2 | 1200/12 | 1300/12 | 1300/12 |
| 14 | 6.2741 | 12.1067 | 1.2 | 1200/12 | 1300/12 | 1300/12 |
| 15 | 6.2494 | 11.9860 | 1.2 | 1200/12 | 1300/12 | 1300/12 |
| 16 | 6.2411 | 11.9105 | 0.8 | 1200/12 | 1300/12 | 1300/12 |
| 17 | 6.2312 | 11.8304 | 0.8 | 1200/12 | 1300/12 | 1300/12 |
| 18 | 6.2243 | 11.7431 | 0.8 | 1200/12 | 1300/12 | 1300/12 |
| 19 | 6.2180 | 11.6516 | 0.8 | 1200/12 | 1300/12 | 1300/12 |
| 20 | 6.1985 | 11.5617 | 0.8 | 1200/12 | 1300/12 | 1300/12 |
| 21 | 6.1690 | 11.5076 | 0.5 | 1200/12 | 1300/12 | 1300/12 |
| 22 | 6.1789 | 11.5754 | 1 | 1200/12 | 1300/12 | 1300/12 |
| 23 | 6.1885 | 11.6607 | 1.2 | 1200/12 | 1300/12 | 1300/12 |
| 24 | 6.2155 | 11.8411 | 1 | 1200/12 | 1300/12 | 1300/12 |
| 25 | 6.2414 | 12.0393 | 1.2 | 1200/12 | 1300/12 | 1300/12 |
| 26 | 6.2570 | 12.1139 | 1 | 1200/12 | 1300/12 | 1300/12 |
| 27 | 6.2684 | 12.1821 | 1.2 | 1200/12 | 1300/12 | 1300/12 |
| 28 | — | — | 0.5 | 1200/12 | 1300/12 | 1300/12 |
| 29 | — | — | 1 | 1200/12 | 1300/12 | 1300/12 |
| 30 | 6.2005 | 11.8440 | 1 | 1200/12 | 1300/12 | 1300/12 |
| 31 | 6.1638 | 11.5993 | 1 | 1200/12 | 1300/12 | 1300/12 |

TABLE 3

| | | | Precursor masses (g) | | | | |
|---|---|---|---|---|---|---|---|
| Ex. | Composition | Color | $Y_2O_3$ | CuO | $TiO_2$ | $Al_2O_3$ | $Ga_2O_3$ | $Fe_2O_3$ |
| 32 | $YCu_{0.5}Ti_{0.5}O_3$ | Yellow Green | 0.8792 | 0.3097 | 0.3110 | — | — | |
| 33 | $YAl_{0.1}Cu_{0.45}Ti_{0.45}O_3$ | Bright Green | 1.0413 | 0.3301 | 0.3315 | 0.0470 | — | |
| 34 | $YGa_{0.1}Cu_{0.45}Ti_{0.45}O_3$ | Bright Green | 0.8729 | 0.2768 | 0.2779 | — | 0.0725 | — |
| 35 | $YFe_{0.1}Cu_{0.45}Ti_{0.45}O_3$ | Light Brown | 0.8792 | 0.2787 | 0.2799 | — | — | 0.0622 |

TABLE 3-continued

| Ex. | Composition | Color | $Y_2O_3$ | CuO | $TiO_2$ | $Mn_2O_3$ | $Fe_2O_3$ | $Lu_2O_3$ |
|---|---|---|---|---|---|---|---|---|
| 36 | $YFe_{0.2}Cu_{0.4}Ti_{0.4}O_3$ | Rich Brown | 0.9963 | 0.2808 | 0.2820 | — | — | 0.1409 |

| | Cell Parameters | | Mass Tot. | 1st Heat | 2nd Heat | 3rd Heat | 4th Heat |
|---|---|---|---|---|---|---|---|
| Ex. | a (Å) | c (Å) | (g) | °C./Hr | °C./Hr | °C./Hr | °C./Hr |
| 32 | 6.1909 | 11.4965 | 1.5 | 900/10 | 1050/18 | 1050/12 | — |
| 33 | 6.1945 | 11.4814 | 1.75 | 900/10 | 1050/18 | 1050/12 | — |
| 34 | 6.1809 | 11.4931 | 1.5 | 900/10 | 1050/18 | — | — |
| 35 | 6.2045 | 11.5603 | 1.5 | 900/12 | 1050/18 | 1050/12 | — |
| 36 | 6.1835 | 11.5462 | 1.5 | 900/12 | 1050/18 | 1050/12 | — |

TABLE 4

| Ex. | Composition | Color | $Y_2O_3$ | CuO | $TiO_2$ | $Mn_2O_3$ | $Lu_2O_3$ | $Yb_2O_3$ |
|---|---|---|---|---|---|---|---|---|
| 37 | $YMn_{0.1}Cu_{0.45}Ti_{0.45}O_3$ | Black | 1.4660 | 0.4648 | 0.4667 | 0.1025 | — | — |
| 38 | $YMn_{0.2}Cu_{0.4}Ti_{0.4}O_3$ | Black | 1.4666 | 0.4144 | 0.4150 | 0.2051 | — | — |
| 39 | $YMn_{0.3}Cu_{0.35}Ti_{0.35}O_3$ | Black | 1.4672 | 0.3618 | 0.3633 | 0.3077 | — | — |
| 40 | $YMn_{0.4}Cu_{0.3}Ti_{0.3}O_3$ | Black | 1.4678 | 0.3102 | 0.3115 | 0.4105 | — | — |
| 41 | $YMn_{0.5}Cu_{0.25}Ti_{0.25}O_3$ | Black | 1.4684 | 0.2586 | 0.2597 | 0.5133 | — | — |
| 42 | $YMn_{0.6}Cu_{0.2}Ti_{0.2}O_3$ | Black | 1.1752 | 0.1656 | 0.1663 | 0.4930 | — | — |
| 43 | $YMn_{0.7}Cu_{0.15}Ti_{0.15}O_3$ | Black | 1.1756 | 0.1242 | 0.1248 | 0.5754 | — | — |
| 44 | $YMn_{0.8}Cu_{0.1}Ti_{0.1}O_3$ | Black | 1.1761 | 0.0829 | 0.0832 | 0.6578 | — | — |
| 45 | $YMn_{0.9}Cu_{0.05}Ti_{0.05}O_3$ | Black | 1.1766 | 0.0415 | 0.0416 | 0.7404 | — | — |
| 46 | $LuMn_{0.5}Cu_{0.25}Ti_{0.25}O_3$ | Black | — | 0.1072 | 0.1076 | 0.2127 | 1.0724 | — |
| 47 | $YbMn_{0.5}Cu_{0.25}Ti_{0.25}O_3$ | Black | — | 0.1079 | 0.1084 | 0.2142 | — | 1.0695 |

| | Cell parameters | | Mass Tot. | 1st heat | 2nd Heat | 3rd Heat | 4th Heat |
|---|---|---|---|---|---|---|---|
| Ex. | a (Å) | c (Å) | (g) | °C./Hr | °C./Hr | °C./Hr | °C./Hr |
| 37 | 6.1897 | 11.4937 | 2.5 | 900/12 | 1050/18 | 1050/12 | 1050/12 |
| 38 | 6.1888 | 11.4866 | 2.5 | 900/12 | 1050/18 | 1050/12 | 1050/12 |
| 39 | 6.1930 | 11.4860 | 2.5 | 900/12 | 1050/18 | 1050/12 | 1050/12 |
| 40 | 6.1806 | 11.4568 | 2.5 | 900/12 | 1050/18 | 1050/12 | 1050/12 |
| 41 | 6.1818 | 11.4741 | 2.5 | 900/12 | 1050/18 | 1050/12 | 1050/12 |
| 42 | 6.1829 | 11.2721 | 2 | 900/12 | 1050/18 | 1050/18 | 1100/12 |
| 43 | 6.1797 | 11.4609 | 2 | 900/12 | 1050/18 | 1050/18 | 1100/12 |
| 44 | 6.1683 | 11.4394 | 2 | 900/12 | 1050/18 | 1050/18 | 1100/12 |
| 45 | 6.1672 | 11.4343 | 2 | 900/12 | 1050/18 | 1050/18 | 1100/12 |
| 46 | 6.0650 | 11.4751 | 1.5 | 900/10 | 1050/10 | — | — |
| 47 | 6.0930 | 11.4603 | 1.5 | 900/10 | 1050/10 | — | — |

TABLE 5

| | | | Precursor masses (g) | | | | | |
|---|---|---|---|---|---|---|---|---|
| Ex. | Composition | Color | $Y_2O_3$ | $Mn_2O_3$ | $In_2O_3$ | $Fe_2O_3$ | $Sc_2O_3$ | $Eu_2O_3$ | $Ga_2O_3$ |
| 48 | $YGa_{0.1}In_{0.8}Mn_{0.1}O_3$ | Bright Blue | 0.4681 | 0.0327 | 0.4602 | — | — | — | 0.0389 |
| 49 | $YGa_{0.1}In_{0.7}Mn_{0.2}O_3$ | Bright Blue | 0.4799 | 0.0672 | 0.4131 | — | — | — | 0.0397 |
| 50 | $YGa_{0.1}In_{0.6}Mn_{0.3}O_3$ | Bright Blue | 0.5949 | 0.1033 | 0.3632 | — | — | — | 0.0409 |
| 51 | $YFe_{0.1}In_{0.8}Mn_{0.1}O_3$ | Blue | 0.4706 | 0.0330 | 0.4630 | 0.0332 | — | — | — |
| 52 | $YFe_{0.2}In_{0.7}Mn_{0.1}O_3$ | Dark Blue | 0.4828 | 0.0337 | 0.4154 | 0.0680 | — | — | — |
| 53 | $YFe_{0.3}In_{0.6}Mn_{0.1}O_3$ | Grey Blue | 0.4953 | 0.0345 | 0.3650 | 0.1049 | — | — | — |
| 54 | $YFe_{0.1}In_{0.7}Mn_{0.2}O_3$ | Blue | 0.4827 | 0.0674 | 0.4156 | 0.0342 | — | — | — |
| 55 | $YFe_{0.2}In_{0.6}Mn_{0.2}O_3$ | Dark Blue | 0.4953 | 0.0694 | 0.3652 | 0.0700 | — | — | — |
| 56 | $YFe_{0.3}In_{0.5}Mn_{0.2}O_3$ | Grey Blue | 0.5085 | 0.0712 | 0.3127 | 0.1076 | — | — | — |
| 57 | $YFe_{0.1}In_{0.6}Mn_{0.3}O_3$ | Dark Blue | 0.4956 | 0.1041 | 0.3656 | 0.0349 | — | — | — |
| 58 | $YFe_{0.2}In_{0.5}Mn_{0.3}O_3$ | Dark Blue | 0.5087 | 0.1064 | 0.3126 | 0.0720 | — | — | — |
| 59 | $YFe_{0.3}In_{0.4}Mn_{0.3}O_3$ | Dark Blue/Black | 0.5226 | 0.1098 | 0.2572 | 0.1109 | — | — | — |
| 60 | $YFe_{0.1}In_{0.5}Mn_{0.4}O_3$ | Dark Blue | 0.5089 | 0.1422 | 0.3126 | 0.0361 | — | — | — |
| 61 | $YFe_{0.2}In_{0.4}Mn_{0.4}O_3$ | Dark Blue/Black | 0.5227 | 0.1463 | 0.2573 | 0.0740 | — | — | — |
| 62 | $YFe_{0.3}In_{0.3}Mn_{0.4}O_3$ | Black | 0.5373 | 0.1502 | 0.1983 | 0.1142 | — | — | — |
| 63 | $YFe_{0.1}In_{0.9}O_3$ | Yellow | 0.4592 | — | 0.5082 | 0.0324 | — | — | — |
| 64 | $YFe_{0.2}In_{0.8}O_3$ | Orange | 0.4705 | — | 0.4628 | 0.0664 | — | — | — |
| 65 | $YFe_{0.3}In_{0.7}O_3$ | Orange | 0.4826 | — | 0.4150 | 0.1024 | — | — | — |
| 66 | $YSc_{0.1}Mn_{0.9}O_3$ | Black | 0.2958 | 0.1861 | — | — | 0.0181 | — | — |
| 67 | $YSc_{0.2}Mn_{0.8}O_3$ | Black | 0.2974 | 0.1663 | — | — | 0.0363 | — | — |

TABLE 5-continued

| Ex. | Composition | Color | | | | | | | |
|---|---|---|---|---|---|---|---|---|---|
| 68 | $Y_{1.95}Eu_{0.05}Mn_{0.25}In_{0.75}O_3$ | Bright Blue | 0.4471 | 0.0823 | 0.4339 | — | — | 0.0367 | — |
| 69 | $Y_{1.9}Eu_{0.1}Mn_{0.25}In_{0.75}O_3$ | Bright Blue | 0.4181 | 0.0812 | 0.4284 | — | — | 0.0724 | — |

| | Cell Parameters | | Mass | 1st Heat | 2nd Heat | 3rd Heat |
|---|---|---|---|---|---|---|
| Ex. | a (Å) | c (Å) | (g) | °C./Hr | °C./Hr | °C./Hr |
| 48 | 6.2165 | 12.0884 | 1 | 1200/12 | 1300/12 | 1300/12 |
| 49 | 6.1936 | 11.9793 | 1 | 1200/12 | 1300/12 | 1300/12 |
| 50 | 6.2038 | 11.9399 | 1 | 1200/12 | 1300/12 | 1300/12 |
| 51 | 6.2320 | 11.9919 | 1 | 1200/12 | 1300/12 | 1300/12 |
| 52 | 6.1972 | 12.0504 | 1 | 1200/12 | 1300/12 | 1300/12 |
| 53 | 6.1706 | 11.9944 | 1 | 1200/12 | 1300/12 | 1300/12 |
| 54 | 6.1922 | 11.9899 | 1 | 1200/12 | 1300/12 | 1300/12 |
| 55 | 6.1215 | 11.9925 | 1 | 1200/12 | 1300/12 | 1300/12 |
| 56 | 6.1840 | 11.9343 | 1 | 1200/12 | 1300/12 | 1300/12 |
| 57 | 6.1922 | 11.9322 | 1 | 1200/12 | 1300/12 | 1300/12 |
| 58 | 6.1534 | 11.9254 | 1 | 1200/12 | 1300/12 | 1300/12 |
| 59 | 6.1445 | 11.8125 | 1 | 1200/12 | 1300/12 | 1300/12 |
| 60 | 6.1850 | 11.8512 | 1 | 1200/12 | 1300/12 | 1300/12 |
| 61 | 6.1510 | 11.7912 | 1 | 1200/12 | 1300/12 | 1300/12 |
| 62 | 6.1283 | 11.7315 | 1 | 1200/12 | 1300/12 | 1300/12 |
| 63 | 6.2218 | 12.1382 | 1 | 1200/12 | 1300/12 | — |
| 64 | 6.1993 | 12.1737 | 1 | 1200/12 | 1300/12 | — |
| 65 | 6.1809 | 12.0494 | 1 | 1200/12 | 1300/12 | — |
| 66 | 6.1744 | 11.5064 | 0.5 | 1200/12 | 1300/12 | — |
| 67 | 6.1726 | 11.5428 | 0.5 | 1200/12 | 1300/12 | — |
| 68 | 6.2479 | 12.0483 | 1 | 1300/12 | 1300/12 | — |
| 69 | 6.2756 | 12.0748 | 1 | 1300/12 | 1300/12 | — |

TABLE 6

| | | | Precursor masses (g) | | | | | |
|---|---|---|---|---|---|---|---|---|
| Ex. | Composition | Color | $Y(NO_3)_3$ *$6H_2O$ | $Al(NO_3)_3$ *$9H_2O$ | $Mn(NO_3)_2$ *$4H_2O$ | $Fe(NO_3)_3$ *$9H_2O$ | $In(NO_3)_3$ *$H_2O$ | $C_6H_8O_7$ |
| 70 | $YAl_{0.8}Mn_{0.2}O_3$ | Grey/Blue tint | 3.3899 | 2.6562 | 0.4762 | — | — | 4.0010 |
| 71 | $YAl_{0.7}Mn_{0.3}O_3$ | Dark Grey/Blue tint | 11.11647 | 7.6215 | 2.1856 | — | — | 20.0284 |
| 72 | $YAl_{0.6}Mn_{0.4}O_3$ | Dark Blue/Lt. Black | 3.2817 | 1.9285 | 0.8608 | — | — | 4.0007 |
| 73 | $YAl_{0.5}Mn_{0.5}O_3$ | Dark Blue/Lt. Black | 10.7670 | 5.2728 | 3.5281 | — | — | 20.0281 |
| 74 | $YAl_{0.4}Mn_{0.6}O_3$ | Dark Blue/Lt. Black | 3.1801 | 1.2459 | 1.2510 | — | — | 4.0008 |
| 75 | $YAl_{0.3}Mn_{0.7}O_3$ | Dark Blue/Lt. Black | 3.1317 | 0.92017 | 1.4366 | — | — | 4.0012 |
| 76 | $YAl_{0.2}Mn_{0.8}O_3$ | Dark Blue/Black | 10.2822 | 2.0141 | 5.3908 | — | — | 20.0306 |
| 77 | $YFeO_3$ | Brown | 2.9807 | — | — | 3.1438 | — | 6.5416 |
| 78 | $YFe_{0.9}In_{0.1}O_3$ | Brown | 2.8922 | — | — | 2.7457 | 0.2408 | 6.3474 |
| 79 | $YFe_{0.8}In_{0.2}O_3$ | Brown | 2.8086 | — | — | 2.3703 | 0.4678 | 6.1636 |
| 80 | $YFe_{0.7}In_{0.3}O_3$ | Brown | 2.7300 | — | — | 2.0159 | 0.6820 | 5.9921 |

| | Cell Parameters | | Mass | 1st Heat | 2nd Heat | 3rd Heat | 4th Heat |
|---|---|---|---|---|---|---|---|
| Ex. | a (Å) | c (Å) | (g) | °C./Hr | °C./Hr | °C./Hr | °C./Hr |
| 70 | 3.6454 | 10.6654 | 1.5 | 250/2 | 750/10 | 900/12 | 900/12 |
| 71 | 3.6352 | 10.8007 | 4 | 250/2 | 750/10 | 900/12 | 900/12 |
| 72 | 3.6369 | 10.8457 | 1.5 | 250/2 | 750/10 | 900/12 | 900/12 |
| 73 | 3.6176 | 10.9879 | 4 | 250/2 | 750/10 | 900/12 | 900/12 |
| 74 | 6.2206 | 11.0421 | 1.5 | 250/2 | 750/10 | 900/12 | 900/12 |
| 75 | 6.2115 | 11.1972 | 1.5 | 250/2 | 750/10 | 900/12 | 900/12 |
| 76 | 6.1882 | 11.2262 | 4 | 250/2 | 750/10 | 900/12 | 900/12 |
| 77 | 6.0685 | 11.7800 | 1.5 | 250/2 | 700/18 | — | — |
| 78 | 6.0857 | 11.8506 | 1.5 | 250/2 | 700/18 | — | — |
| 79 | 6.0905 | 11.9061 | 1.5 | 250/2 | 700/18 | — | — |
| 80 | 6.1024 | 11.9713 | 1.5 | 250/2 | 700/18 | 700/20 | — |

TABLE 7

| Ex. | Composition | Color | Structure | Reactants | Calcination* |
|---|---|---|---|---|---|
| 81 | $LuGa_{0.99}Mn_{0.01}MgO_4$ | Light blue/purple | Hexagonal Double layer | 4.339 g $Lu_2O_3$<br>2.019 g $Ga_2O_3$<br>0.019 g $Mn_2O_3$<br>1.326 g MgO | BM 2 hr.; 1000 C./5 hr.<br>BM 2 hr.; 1350 C./2 hr. |
| 82 | $LuGa_{0.97}Mn_{0.03}MgO_4$ | Blue/purple | Hexagonal Double layer | 4.336 g $Lu_2O_3$<br>1.976 g $Ga_2O_3$<br>0.0516 g $Mn_2O_3$<br>1.509 g MgO | BM 2 hr.; 1000 C./5 hr.<br>BM 2 hr.; 1350 C./2 hr. |
| 83 | $LuGa_{0.95}Mn_{0.05}MgO_4$ | Blue/purple | Hexagonal Double layer | 1.1758 g $Lu_2O_3$<br>0.785 g $Ga_2O_3$<br>0.035 g $Mn_2O_3$<br>0.537 g MgO | BM 2 hr.; 1000 C./5 hr.<br>BM 2 hr.; 1350 C./2 hr. |
| 84 | $LuGa_{0.90}Mn_{0.10}MgO_4$ | Blue/purple | Hexagonal Double layer | | |
| 85 | $LuGa_{0.85}Mn_{0.15}MgO_4$ | Dark blue/purple | Hexagonal Double layer | | |
| 86 | $LuGa_{0.97}Mn_{0.03}ZnO_4$ | Blue/purple | Hexagonal Double layer | 0.430 g $Lu_2O_3$<br>0.2805 g $Ga_2O_3$<br>0.0073 g $Mn_2O_3$<br>0.252 g ZnO | BM 2 hr.; 1000 C./5 hr.<br>BM 2 hr.; 1350 C./2 hr. |
| 87 | $LuGa_{0.95}Mn_{0.05}ZnO_4$ | Blue/purple | Hexagonal Double layer | 2.404 g $Lu_2O_3$<br>1.073 g $Ga_2O_3$<br>0.0477 g $Mn_2O_3$<br>0.984 g ZnO | BM 2 hr.; 1000 C./5 hr.<br>BM 2 hr.; 1350 C./2 hr. |
| 88 | $ScAl_{0.99}Mn_{0.01}MgO_4$ | Purple | Hexagonal Double layer | 0.3126 g $Sc_2O_3$<br>0.229 g $Al_2O_3$<br>0.0036 g $Mn_2O_3$<br>0.276 g MgO | BM 2 hr.; 1000 C./5 hr.<br>BM 2 hr.; 1350 C./2 hr. |
| 89 | $ScAl_{0.95}Mn_{0.05}MgO_4$ | Purple | Hexagonal Double layer | 0.610 g $Sc_2O_3$<br>0.429 g $Al_2O_3$<br>0.035 g $Mn_2O_3$<br>0.538 g MgO | BM 2 hr.; 1000 C./5 hr.<br>BM 2 hr.; 1350 C./2 hr. |
| 90 | $ScAl_{0.90}Mn_{0.10}MgO_4$ | Purple | Hexagonal Double layer | | |
| 91 | $ScAl_{0.85}Mn_{0.15}MgO_4$ | Purple | Hexagonal Double layer | 0.4637 g $Sc_2O_3$<br>0.292 g $Ga_2O_3$<br>0.0796 g $Mn_2O_3$<br>0.409 g MgO | BM 2 hr.; 1000 C./5 hr.<br>BM 2 hr.; 1350 C./2 hr. |
| 92 | $ScAl_{0.95}Mn_{0.05}ZnO_4$ | Blue | Hexagonal Double layer | | |
| 93 | $InGa_{0.99}Mn_{0.01}ZnO_4$ | Green | Hexagonal Double layer | 0.419 g $In_2O_3$<br>0.279 g $Ga_2O_3$<br>0.0023 g MnO<br>0.245 g ZnO | BM 2 hr.; 1000 C./5 hr.<br>BM 2 hr.; 1350 C./2 hr. |
| 94 | $InGa_{0.97}Mn_{0.03}ZnO_4$ | Green | Hexagonal Double layer | | |
| 95 | $InGa_{0.95}Mn_{0.05}ZnO_4$ | Green | Hexagonal Double layer | 1.019 g $In_2O_3$<br>0.651 g $Ga_2O_3$<br>0.0260 g MnO<br>0.597 g ZnO | BM 2 hr.; 1000 C./5 hr.<br>BM 2 hr.; 1400 C./2 hr |
| 96 | $InGa_{0.95}Mn_{0.05}MgO_4$ | Blue | Hexagonal Double layer | 1.003 g $In_2O_3$<br>0.641 g $Ga_2O_3$<br>0.0256 g MnO<br>0.439 g MgO | BM 2 hr.; 1000 C./5 hr.<br>BM 2 hr.; 1400 C./2 hr. |
| 97 | $ScGa_{0.95}Mn_{0.05}ZnO_4$ | Blue | Hexagonal Double layer | 0.608 g $Sc_2O_3$<br>0.783 g $Ga_2O_3$<br>0.0348 g $Mn_2O_3$<br>0.9177 g ZnO | BM 2 hr.; 1000 C./5 hr.<br>BM 2 hr.; 1400 C./2 hr. |
| 98 | $ScGa_{0.95}Mn_{0.05}MgO_4$ | Blue | Hexagonal Double layer | 0.6624 g $Sc_2O_3$<br>0.804 g $Ga_2O_3$<br>0.036 g $Mn_2O_3$<br>0.550 g MgO | BM 2 hr.; 1000 C./5 hr.<br>BM 2 hr.; 1350 C./2 hr. |
| 99 | $LuGa_{0.99}Mn_{0.01}ZnO_4$ | Blue | Hexagonal Double layer | | |
| 100 | $LuGa_{0.95}Mn_{0.05}ZnO_4$ | Blue | Hexagonal Double layer | | |
| 101 | $(In_{1.2}Ga_{0.8})_{0.95}Mn_{0.05}MgO_4$ | Blue | Hexagonal Double layer | 1.514 g $In_2O_3$<br>0.552 g MgO<br>0.645 g $Ga_2O_3$<br>0.0287 g $Mn_2O_3$ | BM 2 hr.; 1000 C./5 hr.<br>BM 2 hr.; 1400 C./2 hr. |
| 102 | $LuGa_{0.99}Mn_{0.01}Zn_2O_5$ | Blue | Hexagonal Triple layer | 0.606 g $Lu_2O_3$<br>0.282 g $Ga_2O_3$<br>0.0024 g $Mn_2O_3$<br>0.496 g ZnO | BM 2 hr.; 1000 C./5 hr.<br>BM 2 hr.; 1350 C./2 hr. |

TABLE 7-continued

| Ex. | Composition | Color | Structure | Reactants | Calcination* |
|---|---|---|---|---|---|
| 103 | $LuGa_{0.95}Mn_{0.05}Zn_2O_5$ | Blue | Hexagonal Triple layer | 1.292 g $Lu_2O_3$<br>0.577 g $Ga_2O_3$<br>0.0256 g $Mn_2O_3$<br>1.057 g ZnO | BM 2 hr.; 1000 C./5 hr.<br>BM 2 hr.; 1350 C./2 hr. |

*BM: powders are ground in an agate ball mill.

We claim:

1. A material, having a formula:

$$AM_{1-x}M'_xM''_yO_{3+y}$$

where A is Sc, Y, Gd, Tb, Dy, Ho, Er, Tm, Yb, Lu, Al, Zn, In, Ga, Ti, Sn, Fe, Mg, or a combination thereof;
M is Sc, Y, Gd, Tb, Dy, Ho, Er, Tm, Yb, Lu, Al, Zn, In, Ga, Ti, Sn, Fe, Mg, or a combination thereof, or M is a 1:1 mixture of $M_A$ and $M_B$ cations where $M_A$ is Zn, Mg, or Cu, and $M_B$ is Ti or Sn;
M' is Mn, Fe, Al, Ga, In, or a combination thereof, M' is a +3 cation, and at least some $M'^{3+}$ cations are bound to oxygen in trigonal bipyramidal coordination as $M'O_5$;
M'' is Mg, Zn, Cu, or a combination thereof;
x is greater than 0.0 but less than or equal to 0.8;
y is an integer ranging from 0-15;
at least one of M and M' comprises Al, Ga, or In; and
M is not Al when y=0, M' is Mn and A is Y, Gd, Tb, Dy, Ho, Er, Tm, Yb, or Lu.

2. The material of claim 1 where the material is chromophoric.

3. The material of claim 1 where M is a +3 cation, and at least some $M^{3+}$ cations are bound to oxygen in trigonal bipyramidal coordination as $MO_5$.

4. The material of claim 3 where y is 0, and the material forms a crystal structure having hexagonal layers comprising $MO_5$ and $M'O_5$ trigonal bipyramids alternating with layers of A cations.

5. The material of claim 4 where the crystal structure has a unit cell wherein edge a has a length of 3.50-3.70 Å and edge c has a length of 10-13 Å.

6. The material of claim 5 where the crystal structure has a unit cell wherein edge a has a length of 5.5-7.0 Å and edge c has a length of 10-13 Å.

7. The material of claim 3 where M' is Mn.

8. The material of claim 7 where Mn is bonded to oxygen with an apical Mn—O bond length of 1.80 Å to 1.95 Å.

9. The material of claim 1 where M' is Mn and y is 0.

10. The material of claim 1 where A is Y, M is In, M' is Mn, and y is 0.

11. The material of claim 10 where x is greater than 0.0 and less than 0.75.

12. The material of claim 1 where A is Lu, M is Ga, and M' is Mn.

13. The material of claim 1 where M is Al and M' is Mn, and further comprising carbonate, wherein the chromophoric material has the formula $AAl_{1-x}Mn_xO_{3-z}(CO_3)_z$ where z is greater than 0.0 and less than or equal to 1.0.

14. The material according to claim 1 selected from $YIn_{1-x}Mn_xO_3$, $DyIn_{1-x}Mn_xO_3$, $HoIn_{1-x}Mn_xO_3$, $ErIn_{1-x}Mn_xO_3$, $YSc_{1-x}Mn_xO_3$, $YFe_{1-x}In_xO_3$, $LuGa_{1-x}Mn_xMgO_4$, $ScAl_{1-x}Mn_xZnO_4$, $ScAl_{1-x}Mn_xMgO_4$, $InGa_{1-x}Mn_xZnO_4$, $InGa_{1-x}Mn_xMgO_4$, $ScGa_{1-x}Mn_xMgO_4$, $ScGa_{1-x}Mn_xMgO_4$, $LuGa_{1-x}Mn_xMgO_4$, $LuGa_{1-x}Mn_xZn_2O_5$, $Y(Cu,Ti)_{1-x}Al_xO_3$, $Y(Cu,Ti)_{1-x}Ga_xO_3$, $Y(Cu,Ti)_{1-x}In_xO_3$, $Y(Cu,Ti)_{1-x}Fe_xO_3$, $Yb(Cu,Ti)_{1-x}Mn_xO_3$, $Lu(Cu,Ti)_{1-x}Mn_xO_3$, $Y(Fe,In)_{1-x}Mn_xO_3$, $Y(Mn,In)_{1-x}Fe_xO_3$, $(Y,Eu)Mn_{1-x}In_xO_3$, $In(In,Ga)_{1-x}Mn_xMgO_4$, and $Y(Ga,In)_{1-x}Mn_xO_3$.

15. The material according to claim 1 selected from $YIn_{0.95}Mn_{0.05}O_3$, $YIn_{0.9}Mn_{0.1}O_3$, $YIn_{0.85}Mn_{0.15}O_3$, $YIn_{0.8}Mn_{0.2}O_3$, $YIn_{0.75}Mn_{0.25}O_3$, $YIn_{0.7}Mn_{0.3}O_3$, $YIn_{0.65}Mn_{0.35}O_3$, $YIn_{0.6}Mn_{0.4}O_3$, $YIn_{0.55}Mn_{0.45}O_3$, $YIn_{0.5}Mn_{0.5}O_3$, $YIn_{0.25}Mn_{0.75}O_3$, $YIn_{0.1}Mn_{0.9}O_3$, $DyIn_{0.9}Mn_{0.1}O_3$, $DyIn_{0.8}Mn_{0.2}O_3$, $DyIn_{0.7}Mn_{0.3}O_3$, $DyIn_{0.6}Mn_{0.4}O_3$, $DyIn_{0.5}Mn_{0.5}O_3$, $DyIn_{0.4}Mn_{0.6}O_3$, $DyIn_{0.3}Mn_{0.7}O_3$, $DyIn_{0.2}Mn_{0.8}O_3$, $HoIn_{0.9}Mn_{0.1}O_3$, $HoIn_{0.8}Mn_{0.2}O_3$, $HoIn_{0.7}Mn_{0.3}O_3$, $HoIn_{0.5}Mn_{0.5}O_3$, $HoIn_{0.3}Mn_{0.7}O_3$, $HoIn_{0.2}Mn_{0.8}O_3$, $HoIn_{0.1}Mn_{0.9}O_3$, $ErIn_{0.9}Mn_{0.1}O_3$, $ErIn_{0.8}Mn_{0.2}O_3$, $ErIn_{0.5}Mn_{0.5}O_3$, $ErIn_{0.2}Mn_{0.8}O_3$, $YAl_{0.1}Cu_{0.45}Ti_{0.45}O_3$, $YGa_{0.1}Cu_{0.45}Ti_{0.45}O_3$, $YIn_{0.1}Cu_{0.45}Ti_{0.45}O_3$, $YFe_{0.1}Cu_{0.45}Ti_{0.45}O_3$, $YFe_{0.2}Cu_{0.4}Ti_{0.4}O_3$, $YMn_{0.1}Cu_{0.45}Ti_{0.45}O_3$, $YMn_{0.2}Cu_{0.4}Ti_{0.4}O_3$, $YMn_{0.3}Cu_{0.35}Ti_{0.35}O_3$, $YMn_{0.4}Cu_{0.3}Ti_{0.3}O_3$, $YMn_{0.5}Cu_{0.25}Ti_{0.25}O_3$, $YMn_{0.6}Cu_{0.2}Ti_{0.2}O_3$, $YMn_{0.7}Cu_{0.15}Ti_{0.15}O_3$, $YMn_{0.8}Cu_{0.1}Ti_{0.1}O_3$, $YMn_{0.9}Cu_{0.05}Ti_{0.05}O_3$, $LuMn_{0.5}Cu_{0.25}Ti_{0.25}O_3$, $YbMn_{0.5}Cu_{0.25}Ti_{0.25}O_3$, $YGa_{0.1}In_{0.8}Mn_{0.1}O_3$, $YGa_{0.1}In_{0.7}Mn_{0.2}O_3$, $YGa_{0.1}In_{0.6}Mn_{0.3}O_3$, $YFe_{0.1}In_{0.8}Mn_{0.1}O_3$, $YFe_{0.2}In_{0.7}Mn_{0.1}O_3$, $YFe_{0.3}In_{0.6}Mn_{0.1}O_3$, $YFe_{0.1}In_{0.7}Mn_{0.2}O_3$, $YFe_{0.2}In_{0.6}Mn_{0.2}O_3$, $YFe_{0.3}In_{0.5}Mn_{0.2}O_3$, $YFe_{0.1}In_{0.6}Mn_{0.3}O_3$, $YFe_{0.2}In_{0.5}Mn_{0.3}O_3$, $YFe_{0.3}In_{0.4}Mn_{0.3}O_3$, $YFe_{0.1}In_{0.5}Mn_{0.4}O_3$, $YFe_{0.2}In_{0.4}O_3$, $YFe_{0.3}In_{0.3}Mn_{0.4}O_3$, $YFe_{0.1}In_{0.9}O_3$, $YFe_{0.2}In_{0.8}O_3$, $YFe_{0.3}In_{0.7}O_3$, $YFe_{0.7}In_{0.3}O_3$, $YFe_{0.8}In_{0.2}O_3$, $YFe_{0.9}In_{0.1}O_3$, $YSc_{0.1}Mn_{0.9}O_3$, $YSc_{0.2}Mn_{0.8}O_3$, $Y_{1.95}Eu_{0.05}Mn_{0.25}In_{0.75}O_3$, $Y_{1.9}Eu_{0.1}Mn_{0.25}In_{0.75}O_3$, $YAl_{0.20}Mn_{0.80}O_{3-z}(CO_3)_z$, $YAl_{0.30}Mn_{0.70}O_{3-z}(CO_3)_z$, $YAl_{0.40}Mn_{0.60}O_{3-z}(CO_3)_z$, $YAl_{0.50}Mn_{0.50}O_{3-z}(CO3)_z$, $YAl_{0.60}Mn_{0.40}O_{3-z}(CO_3)_z$, $YAl_{0.70}Mn_{0.30}O_{3-z}(CO_3)_z$, $YAl_{0.80}Mn_{0.20}O_{3-z}(CO3)_z$, $LuGa_{0.99}Mn_{0.01}MgO_4$, $LuGa_{0.97}Mn_{0.03}MgO_4$, $LuGa_{0.95}Mn_{0.05}MgO_4$, $LuGa_{0.90}Mn_{0.10}MgO_4$, $LuGa_{0.85}Mn_{0.15}MgO_4$, $LuGa_{0.97}Mn_{0.03}ZnO_4$, $LuGa_{0.95}Mn_{0.05}ZnO_4$, $ScAl_{0.99}Mn_{0.01}MgO_4$, $ScAl_{0.95}Mn_{0.05}MgO_4$, $ScAl_{0.90}Mn_{0.95}MgO_4$, $ScAl_{0.85}Mn_{0.15}MgO_4$, $ScAl_{0.95}Mn_{0.05}ZnO_4$, $InGa_{0.97}Mn_{0.03}ZnO_4$, $InGa_{0.97}Mn_{0.03}ZnO_4$, $InGa_{0.95}Mn_{0.05}ZnO_4$, $InGa_{0.95}Mn_{0.05}MgO_4$, $ScGa_{0.95}Mn_{0.05}ZnO_4$, $ScGa_{0.95}Mn_{0.05}MgO_4$, $LuGa_{0.99}Mn_{0.01}ZnO_4$, $LuGa_{0.95}Mn_{0.05}ZnO_4$, $In(In_{0.2}Ga_{0.8})_{0.95}Mn_{0.05}MgO_4$, $LuGa_{0.99}Mn_{0.01}Zn_2O_5$, $LuGa_{0.95}Mn_{0.05}Zn_2O_5$, and $In(In_{0.2}Ga_{0.8})_{0.95}Mn_{0.05}MgO_4$.

16. A composition, comprising:
a material having a formula $AM_{1-x}M'_xM''_yO_{3+y}$ where A is Sc, Y, Gd, Tb, Dy, Ho, Er, Tm, Yb, Lu, Al, Zn, In, Ga, Ti, Sn, Fe, Mg, or a combination thereof; M is Sc, Y, Gd, Tb, Dy, Ho, Er, Tm, Yb, Lu, Al, Zn, In, Ga, Ti, Sn, Fe, Mg, or a combination thereof, or M is a 1:1 mixture of $M_A$ and $M_B$ cations where $M_A$ is Zn, Mg, or Cu, and $M_B$ is Ti or Sn; M' is Mn, Fe, Al, Ga, In, or a combination thereof, M' is a +3 cation, and at least some $M'^{3+}$ cations are bound to oxygen in trigonal bipyramidal coordination as $M'O_5$;

M" is Mg, Zn, Cu, or a combination thereof; x is greater than 0.0 but less than 1.0; y is 0 or an integer from 1-6; at least one of M and M' comprises Al, Ga, or In; and M is not Al when y=0, M' is Mn and A is Y, Gd, Tb, Dy, Ho, Er, Tm, Yb, or Lu; and at least one additional component.

17. The composition of claim 16 where the composition is a paint, an ink, a glass, a plastic, or a decorative cosmetic preparation.

18. The composition of claim 16 where the composition is a paint or an ink, and the at least one additional component is a binder, a solvent, a catalyst, a thickener, a stabilizer, an emulsifier, a texturizer, an adhesion promoter, a UV stabilizer, a flattener, a preservative, or a combination thereof.

19. The composition of claim 15 where the composition is a glass, and the at least one additional component is an oxide of silicon, boron, germanium, or a combination thereof.

20. The composition of claim 16 where the material is selected from $YIn_{1-x}Mn_xO_3$, $DyIn_{1-x}Mn_xO_3$, $HoIn_{1-x}Mn_xO_3$, $ErIn_{1-x}Mn_xO_3$, $YSc_{1-x}Mn_xO_3$, $YFe_{1-x}In_xO_3$, $LuGa_{1-x}Mn_xMgO_4$, $ScAl_{1-x}Mn_xZnO_4$, $ScAl_{1-x}Mn_xMgO_4$, $InGa_{1-x}Mn_xZnO_4$, $InGa_{1-x}Mn_xMgO_4$, $ScGa_{1-x}Mn_xZnO_4$, $ScGa_{1-x}Mn_xMgO_4$, $LuGa_{1-x}Mn_xZnO_4$, $LuGa_{1-x}Mn_xMgO_4$, $LuGa_{1-x}Mn_xZn_2O_5$, $Y(Cu,Ti)_{1-x}Al_xO_3$, $Y(Cu,Ti)_{1-x}Ga_xO_3$, $Y(Cu,Ti)_{1-x}In_xO_3$, $Y(Cu,Ti)_{1-x}Fe_xO_3$, $Yb(Cu,Ti)_{1-x}Mn_xO_3$, $Lu(Cu,Ti)_{1-x}Mn_xO_3$, $Y(Fe,In)_{1-x}Mn_xO_3$, $Y(Mn,In)_{1-x}Fe_xO_3$, $(Y,Eu)Mn_{1-x}In_xO_3$, $In(In,Ga)_{1-x}Mn_xMgO_4$, and $Y(Ga,In)_{1-x}Mn_xO_3$.

21. The composition of claim 16 where the material is selected from $YIn_{0.95}Mn_{0.50}O_3$, $YIn_{0.9}Mn_{0.1}O_3$, $YIn_{0.85}Mn_{0.15}O_3$, $YIn_{0.8}Mn_{0.2}O_3$, $YIn_{0.75}Mn_{0.25}O_3$, $YIn_{0.7}Mn_{0.3}O_3$, $YIn_{0.65}Mn_{0.35}O_3$, $YIn_{0.6}Mn_{0.4}O_3$, $YIn_{0.55}Mn_{0.45}O_3$, $YIn_{0.5}Mn_{0.5}O_3$, $YIn_{0.25}Mn_{0.75}O_3$, $YIn_{0.1}Mn_{0.9}O_3$, $DyIn_{0.9}Mn_{0.1}O_3$, $DyIn_{0.8}Mn_{0.2}O_3$, $DyIn_{0.7}Mn_{0.3}O_3$, $DyIn_{0.6}Mn_{0.4}O_3$, $DyIn_{0.5}Mn_{0.5}O_3$, $DyIn_{0.4}Mn_{0.6}O_3$, $DyIn_{0.3}Mn_{0.7}O_3$, $DyIn_{0.2}Mn_{0.8}O_3$, $HoIn_{0.9}Mn_{0.1}O_3$, $HoIn_{0.8}Mn_{0.2}O_3$, $HoIn_{0.7}Mn_{0.3}O_3$, $HoIn_{0.5}Mn_{0.5}O_3$, $HoIn_{0.3}Mn_{0.7}O_3$, $HoIn_{0.2}Mn_{0.8}O_3$, $HoIn_{0.1}Mn_{0.9}O_3$, $ErIn_{0.9}Mn_{0.1}O_3$, $ErIn_{0.8}Mn_{0.2}O_3$, $ErIn_{0.5}Mn_{0.5}O_3$, $ErIn_{0.2}Mn_{0.8}O_3$, $YAl_{0.1}Cu_{0.45}Ti_{0.45}O_3$, $YGa_{0.1}Cu_{0.45}Ti_{0.45}O_3$, $YIn_{0.1}Cu_{0.45}Ti_{0.45}O_3$, $YFe_{0.1}Cu_{0.45}Ti_{0.45}O_3$, $YFe_{0.2}Cu_{0.4}Ti_{0.4}O_3$, $YMn_{0.1}Cu_{0.45}Ti_{0.45}O_3$, $YMn_{0.2}Cu_{0.4}Ti_{0.4}O_3$, $YMn_{0.3}Cu_{0.35}Ti_{0.35}O_3$, $YMn_{0.4}Cu_{0.3}Ti_{0.3}O_3$, $YMn_{0.5}Cu_{0.25}Ti_{0.25}O_3$, $YMn_{0.6}Cu_{0.2}Ti_{0.2}O_3$, $YMn_{0.7}Cu_{0.15}Ti_{0.15}O_3$, $YMn_{0.8}Cu_{0.1}Ti_{0.1}O_3$, $YMn_{0.9}Cu_{0.05}Ti_{0.05}O_3$, $LuMn_{0.5}Cu_{0.25}Ti_{0.25}O_3$, $YbMn_{0.5}Cu_{0.25}Ti_{0.25}O_3$, $YGa_{0.1}In_{0.8}Mn_{0.1}O_3$, $YGa_{0.1}In_{0.7}Mn_{0.2}O_3$, $YGa_{0.1}In_{0.6}Mn_{0.3}O_3$, $YFe_{0.1}In_{0.8}Mn_{0.1}O_3$, $YFe_{0.2}In_{0.7}Mn_{0.1}O_3$, $YFe_{0.3}In_{0.6}Mn_{0.1}O_3$, $YFe_{0.1}In_{0.7}Mn_{0.2}O_3$, $YFe_{0.2}In_{0.6}Mn_{0.2}O_3$, $YFe_{0.3}In_{0.5}Mn_{0.2}O_3$, $YFe_{0.1}In_{0.6}Mn_{0.3}O_3$, $YFe_{0.2}In_{0.5}Mn_{0.3}O_3$, $YFe_{0.3}In_{0.4}Mn_{0.3}O_3$, $YFe_{0.1}In_{0.5}Mn_{0.4}O_3$, $YFe_{0.2}In_{0.4}Mn_{0.4}O_3$, $YFe_{0.3}In_{0.3}Mn_{0.4}O_3$, $YFe_{0.1}In_{0.9}O_3$, $YFe_{0.2}In_{0.8}O_3$, $YFe_{0.3}In_{0.7}O_3$, $YFe_{0.7}In_{0.3}O_3$, $YFe_{0.8}In_{0.2}O_3$, $YFe_{0.9}In_{0.1}O_3$, $YSc_{0.1}Mn_{0.9}O_3$, $YSc_{0.2}Mn_{0.8}O_3$, $Y_{1.95}Eu_{0.05}Mn_{0.25}In_{0.75}O_3$, $Y_{1.9}Eu_{0.1}Mn_{0.25}In_{0.75}O_3$, $YAl_{0.20}Mn_{0.80}O_{3-z}(CO_3)_z$, $YAl_{0.30}Mn_{0.70}O_{3-z}(CO_3)_z$, $YAl_{0.40}Mn_{0.60}O_{3-z}(CO_3)_z$, $YAl_{0.50}Mn_{0.50}O_{3-z}(CO_3)_z$, $YAl_{0.60}Mn_{0.40}O_{3-z}(CO_3)_z$, $YAl_{0.70}Mn_{0.30}O_{3-z}(CO_3)_z$, $YAl_{0.80}Mn_{0.20}O_{3-z}(CO_3)_z$, $LuGa_{0.99}Mn_{0.01}MgO_4$, $LuGa_{0.97}Mn_{0.03}MgO_4$, $LuGa_{0.95}Mn_{0.05}MgO_4$, $LuGa_{0.90}Mn_{0.10}MgO_4$, $LuGa_{0.85}Mn_{0.15}MgO_4$, $LuGa_{0.97}Mn_{0.03}ZnO_4$, $LuGa_{0.95}Mn_{0.05}ZnO_4$, $ScAl_{0.99}Mn_{0.01}MgO_4$, $ScAl_{0.95}Mn_{0.05}MgO_4$, $ScAl_{0.90}Mn_{0.95}MgO_4$, $ScAl_{0.85}Mn_{0.15}MgO_4$, $ScAl_{0.95}Mn_{0.05}ZnO_4$, $InGa_{0.97}Mn_{0.03}ZnO_4$, $InGa_{0.97}Mn_{0.03}ZnO_4$, $InGa_{0.95}Mn_{0.05}ZnO_4$, $InG_{0.95}Mn_{0.05}MgO_4$, $ScGa_{0.95}Mn_{0.05}ZnO_4$, $ScGa_{0.95}Mn_{0.05}MgO_4$, $LuGa_{0.99}Mn_{0.01}ZnO_4$, $LuGa_{0.95}Mn_{0.05}ZnO_4$, $In(In_{0.2}Ga_{0.8})_{0.95}Mn_{0.05}MgO_4$, $LuGa_{0.99}Mn_{0.01}Zn_2O_5$, $LuGa_{0.95}Mn_{0.05}Zn_2O_5$, and $In(In_{0.2}Ga_{0.8})_{0.95}Mn_{0.05}MgO_4$.

22. The composition of claim 16 where the material is $YIn_{1-x}Mn_xO_3$, and x is greater than 0.0 and less than 0.75.

23. The composition of claim 16, further comprising at least one additional material, wherein the at least one additional material is chromophoric.

24. The composition of claim 16, further comprising at least one additional material according to claim 1.

25. A method for making a material having a formula $AM_{1-x}M'_xM''_yO_{3+y}$ where A is Sc, Y, Gd, Tb, Dy, Ho, Er, Tm, Yb, Lu, Al, Zn, In, Ga, Ti, Sn, Fe, Mg, or a combination thereof; M is Sc, Y, Gd, Tb, Dy, Ho, Er, Tm, Yb, Lu, Al, Zn, In, Ga, Ti, Sn, Fe, Mg, or a combination thereof, or M is a 1:1 mixture of $M_A$ and $M_B$ cations where $M_A$ is Zn, Mg, or Cu, and $M_B$ is Ti or Sn; M' is Mn, Fe, Al, Ga, In, or a combination thereof, M' is a +3 cation, and at least some $M'^{3+}$ cations are bound to oxygen in trigonal bipyramidal coordination as $M'O_5$; M" is Mg, Zn, Cu, or a combination thereof; x is greater than 0.0 but less than 1.0; y is 0 or an integer from 1-6; at least one of M and M' comprises Al, Ga, or In; and M is not Al when y=0, M' is Mn and A is Y, Gd, Tb, Dy, Ho, Er, Tm, Yb, or Lu, the method comprising:

providing powders comprising metals desired in the material;

combining the powders in stoichiometric quantities to achieve a desired final ratio of the metals in the material;

heating the powders at a temperature of about 700° C. to about 1500° C. for about 2 hours to about 20 hours to produce the material.

26. The method of claim 25 where the powders are metal oxides or metal nitrates.

27. The method of claim 26, further comprising, after combining the powders in stoichiometric quantities, pressing the powders into a pellet before heating.

28. The method of claim 27, further comprising:
grinding the pellet after heating to produce a powder;
pressing the powder into a pellet; and
heating the pellet at a temperature of 700-1500° C. for 2-20 hours.

29. The method of claim 25 where the material has the formula $YIn_{1-x}Mn_xO_3$.

30. A method for varying color in a material having a formula $AM_{1-x}M'_xM''_yO_{3+y}$ where A is Sc, Y, Gd, Tb, Dy, Ho, Er, Tm, Yb, Lu, Al, Zn, In, Ga, Ti, Sn, Fe, Mg, or a combination thereof; M is Sc, Y, Gd, Tb, Dy, Ho, Er, Tm, Yb, Lu, Al, Zn, In, Ga, Ti, Sn, Fe, Mg, or a combination thereof, or M is a 1:1 mixture of $M_A$ and $M_B$ cations where $M_A$ is Zn, Mg, or Cu, and $M_B$ is Ti or Sn; M' is Mn, Fe, Al, Ga, In, or a combination thereof, M' is a +3 cation, and at least some $M'^{3+}$ cations are bound to oxygen in trigonal bipyramidal coordination as $M'O_5$; M" is Mg, Zn, Cu, or a combination thereof; x is greater than 0.0 but less than 1.0; y is 0 or an integer from 1-6; at least one of M and M' comprises Al, Ga, or In; and M is not Al when y=0, M' is Mn and A is Y, Gd, Tb, Dy, Ho, Er, Tm, Yb, or Lu; and where the material has a color that varies along a color continuum as x increases, the method comprising:

providing powders comprising metals desired in the material;

selecting a value of x to provide a desired color along the color continuum;

combining the powders in stoichiometric quantities according to the value of x; and heating the powders at a temperature of about 700° C. to about 1500° C. for about 2 hours to about 20 hours to produce the material with the desired color.

31. A method for making a composition, comprising:

providing a material having a formula $AM_{1-x}M'_xM''_yO_{3+y}$, where A is Sc, Y, Gd, Tb, Dy, Ho, Er, Tm, Yb, Lu, Al, Zn, In, Ga, Ti, Sn, Fe, Mg, or a combination thereof; M is Sc, Y, Gd, Tb, Dy, Ho, Er, Tm, Yb, Lu, Al, Zn, In, Ga, Ti, Sn, Fe, Mg, or a combination thereof, or M is a 1:1 mixture of $M_A$ and $M_B$ cations where $M_A$ is Zn, Mg, or Cu, and $M_B$ is Ti or Sn; M' is Mn, Fe, Al, Ga, In, or a combination thereof, M' is a +3 cation, and at least some $M'^{3+}$ cations are bound to oxygen in trigonal bipyramidal coordination as $M'O_5$; M" is Mg, Zn, Cu, or a combination thereof; x is greater than 0.0 but less than 1.0; y is 0 or an integer from 1-6; at least one of M and M' comprises Al, Ga, or In; and M is not Al when y=0, M' is Mn and A is Y, Gd, Tb, Dy, Ho, Er, Tm, Yb, or Lu;

combining the material with at least one additional component to produce the composition.

32. The method of claim 31 where providing the material comprises:

providing powders comprising metals desired in the material;

combining the powders in stoichiometric quantities to achieve a desired final ratio of the metals in the material; and heating the powders at a temperature of about 700° C. to about 1500° C. for about 2 hours to about 20 hours to produce the material.

33. The method of claim 31 where the material has the formula $YIn_{1-x}Mn_xO_3$.

* * * * *